(12) United States Patent
Kim et al.

(10) Patent No.: US 11,113,850 B2
(45) Date of Patent: Sep. 7, 2021

(54) ELECTRONIC APPARATUS AND CONTROL METHOD THEREOF

(71) Applicant: Samsung Electronics Co., Ltd., Suwon-si (KR)

(72) Inventors: Byounghyun Kim, Suwon-si (KR); Youngin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 6 days.

(21) Appl. No.: 16/526,174

(22) Filed: Jul. 30, 2019

(65) Prior Publication Data

US 2020/0105026 A1 Apr. 2, 2020

(30) Foreign Application Priority Data

Sep. 27, 2018 (KR) ........................ 10-2018-0114719

(51) Int. Cl.
| | |
|---|---|
| *G06T 11/00* | (2006.01) |
| *G06T 7/90* | (2017.01) |
| *G06T 7/70* | (2017.01) |
| *G06F 3/14* | (2006.01) |
| *G06K 9/00* | (2006.01) |

(52) U.S. Cl.
CPC .............. *G06T 11/001* (2013.01); *G06F 3/14* (2013.01); *G06K 9/00664* (2013.01); *G06T 7/70* (2017.01); *G06T 7/90* (2017.01)

(58) Field of Classification Search
CPC . G06T 11/001; G06T 7/90; G06T 7/70; G06F 3/14; G06K 9/00664
See application file for complete search history.

(56) References Cited

U.S. PATENT DOCUMENTS

| | | |
|---|---|---|
| 6,404,447 B1 | 6/2002 | Kitagawa |
| 9,198,496 B2 | 12/2015 | Shintani |
| (Continued) | | |

FOREIGN PATENT DOCUMENTS

| | | |
|---|---|---|
| EP | 3316570 | 5/2018 |
| EP | 3242245 | 6/2018 |
| (Continued) | | |

OTHER PUBLICATIONS

Cohen, Scott. Finding color and shape patterns in images. No. 1620. Stanford University, Department of Computer Science, 1999. (Year: 1999).*

(Continued)

*Primary Examiner* — Xin Sheng
(74) *Attorney, Agent, or Firm* — Staas & Halsey LLP

(57) ABSTRACT

An electronic apparatus includes a communicator, a camera, and a processor configured to obtain an image including a display apparatus through the camera, identify the display apparatus from the image, analyze at least one pattern of the remaining areas excluding an area corresponding to the display apparatus in the image, and obtain a pattern corresponding to the image based on patterns included in the image by ratios equal to or greater than a predetermined ratio among the at least one pattern, cluster the colors of the remaining areas into at least one color, and control the communicator such that an image generated by applying the at least one clustered color to the obtained pattern is output at the display apparatus.

20 Claims, 28 Drawing Sheets

(56) References Cited

U.S. PATENT DOCUMENTS

| | | |
|---|---|---|
| 2003/0214527 A1 | 11/2003 | Paul |
| 2006/0181645 A1 | 8/2006 | Sarika |
| 2008/0258590 A1* | 10/2008 | Van De Sluis ......... A47F 11/10 312/237 |
| 2009/0015593 A1 | 1/2009 | Kang et al. |
| 2009/0262257 A1 | 10/2009 | Baurmann et al. |
| 2012/0013646 A1* | 1/2012 | Ichioka ................... H04N 5/44 345/690 |
| 2014/0285399 A1 | 9/2014 | Jain et al. |
| 2014/0307084 A1* | 10/2014 | Zontrop ............. H04N 1/00129 348/121 |
| 2014/0355873 A1* | 12/2014 | Sah ....................... G06T 7/0004 382/165 |
| 2015/0279115 A1 | 10/2015 | Vukicevic |
| 2015/0286456 A1 | 10/2015 | Griffin et al. |
| 2017/0262247 A1* | 9/2017 | Yoganandan ............ G09G 5/14 |
| 2019/0129520 A1 | 5/2019 | Shin et al. |

FOREIGN PATENT DOCUMENTS

| | | |
|---|---|---|
| KR | 10-2009-0005621 | 1/2009 |
| KR | 10-2013-0124111 | 11/2013 |
| KR | 10-2017-0136920 | 12/2017 |

OTHER PUBLICATIONS

Fulde ("Colour Ratios, White Balance, and How to use them to improve your photography", Jul. 2018, https://blog.jpegmini.com/colour-ratios-white-balance-and-how-to-use-them-to-improve-your-photography/) (Year: 2018).*

Extended European Search Report dated Feb. 27, 2020 in European Patent Application No. 19186912.2.

International Search Report and Written Opinion of the International Searching Authority dated Nov. 18, 2019 in International Patent Application No. PCT/KR2019/010356.

* cited by examiner

ELECTRONIC APPARATUS AND CONTROL METHOD THEREOF

CROSS-REFERENCE TO RELATED APPLICATIONS

This application is based on and claims priority under 35 U.S.C. § 119(a) to Korean Patent Application No. 10-2018-0114719, filed on Sep. 27, 2018, in the Korean Intellectual Property Office, the disclosure of which is incorporated by reference herein in its entirety.

BACKGROUND

1. Field

The disclosure relates to an electronic apparatus and a control method thereof, and more particularly, to an electronic apparatus which controls a display apparatus to output an image and a control method thereof.

2. Description of Related Art

Following the recent development of electronic technologies, electronic apparatuses providing various user experiences are being developed. In particular, recently, display apparatuses that can display photographs selected by a user, etc. in a standby mode are being developed.

Meanwhile, such photographs, etc. may not be related with colors, patterns, etc. around a display apparatus. In this case, an area where a display apparatus is located is visually separated from the surrounding area of the display apparatus, and thus a user may have a sense of a difference between the display apparatus and the surrounding area.

SUMMARY

The disclosure was devised for overcoming the aforementioned problem, and the purpose of the disclosure is in outputting an image on the display apparatus that is matched up with a surrounding area of the display apparatus, and thereby making a user not feel a sense of difference visually with respect to the area where the display apparatus is located and the surrounding area of the display apparatus.

Additional aspects will be set forth in part in the description which follows and, in part, will be apparent from the description, or may be learned by practice of the presented embodiments.

An electronic apparatus according to an embodiment of the disclosure for achieving the aforementioned purpose includes a communicator, a camera, and a processor configured to obtain an image including a display apparatus through the camera, identify the display apparatus from the image, analyze at least one pattern of remaining areas excluding an area corresponding to the display apparatus in the image, and obtain a pattern corresponding to the image based on patterns included in the image by ratios equal to or greater than a predetermined ratio among the at least one pattern, cluster the colors of the remaining areas into at least one color, and control the communicator such that an image generated by applying the at least one clustered color to the obtained pattern is output at the display apparatus.

Here, the processor may analyze patterns of each area located in different directions based on the display apparatus, and based on patterns included in the image by ratios equal to or greater than a predetermined ratio among the patterns of each area and the locations of the patterns included by ratios equal to or greater than a predetermined ratio, obtain a pattern corresponding to the image, and apply the clustered colors to the obtained pattern.

Also, the processor may analyze colors of each area located in different directions based on the display apparatus, and based on similarity among the colors of each area, cluster colors included in the obtained image, and based on an area wherein the clustered colors are located based on the display apparatus, apply the clustered colors to the obtained pattern.

In addition, the processor may obtain a pattern of which similarity to patterns included in the image by ratios equal to or greater than a predetermined ratio is relatively high among a plurality of pre-stored patterns as a pattern corresponding to the image.

Further, the processor may, based on a pattern different from the plurality of pre-stored patterns being included in the image, additionally cluster the color of the different pattern, and apply the at least one clustered color and the additionally clustered color to the obtained pattern.

Also, the processor may analyze colors included in the obtained image in units of pixels, and cluster pixels wherein similarity among the colors is equal to or greater than a predetermined threshold among a plurality of pixels included in the image.

In addition, the processor may, based on the obtained pattern being in need of application of colors in a smaller number than a predetermined number, analyze colors occupying ratios equal to or greater than a predetermined ratio among a plurality of colors included in the clustered colors, and apply the colors occupying ratios equal to or greater than a predetermined ratio to the obtained pattern.

Further, the processor may, based on the obtained pattern being in need of application of colors in a number equal to or greater than a predetermined number, apply a plurality of colors included in the clustered colors randomly to the obtained pattern.

Also, the processor may identify the ratio that each of the clustered colors occupies in the image, and apply clustered colors of which ratios are high to the obtained pattern relatively more than clustered colors of which ratios are low.

In addition, the processor may identify the ratio that each of the clustered colors occupies in the image, and based on clustered colors occupying ratios equal to or greater than a predetermined ratio being present, adjust the ratio of each of the clustered colors, and apply each of the clustered colors of which ratio has been adjusted to the obtained pattern.

Meanwhile, a control method of an electronic apparatus according to an embodiment of the disclosure includes obtaining an image including a display apparatus, identifying the display apparatus from the image, analyzing at least one pattern of remaining areas excluding an area corresponding to the display apparatus in the image, and obtaining a pattern corresponding to the image based on patterns included in the image by ratios equal to or greater than a predetermined ratio among the at least one pattern, clustering the colors of the remaining areas into at least one color, and controlling such that an image generated by applying the at least one clustered color to the obtained pattern is output at the display apparatus.

Here, in the applying, patterns of each area located in different directions may be analyzed based on the display apparatus, and based on patterns included in the image by ratios equal to or greater than a predetermined ratio among the patterns of each area and the locations of the patterns included by ratios equal to or greater than a predetermined ratio, a pattern corresponding to the image may be obtained, and the clustered colors may be applied to the obtained pattern.

Also, in the applying, colors of each area located in different directions may be analyzed based on the display apparatus, and based on similarity among the colors of each area, colors included in the obtained image may be clustered, and based on an area wherein the clustered colors are located based on the display apparatus, the clustered colors may be applied to the obtained pattern.

Meanwhile, in the obtaining, a pattern of which similarity to patterns included in the image by ratios equal to or greater than a predetermined ratio is relatively high among a plurality of pre-stored patterns may be obtained as a pattern corresponding to the image.

Also, in the obtaining, in case a pattern different from the plurality of pre-stored patterns is included in the image, the color of the different pattern may be additionally clustered, and the at least one clustered color and the additionally clustered color may be applied to the obtained pattern.

Meanwhile, in the clustering, colors included in the obtained image may be analyzed in units of pixels, and pixels wherein similarity among the colors is equal to or greater than a predetermined threshold among a plurality of pixels included in the image may be clustered.

Also, in the applying, in case the obtained pattern is in need of application of colors in a smaller number than a predetermined number, colors occupying ratios equal to or greater than a predetermined ratio among a plurality of colors included in the clustered colors may be analyzed, and the colors occupying ratios equal to or greater than a predetermined ratio may be applied to the obtained pattern.

In addition, in the applying, in case the obtained pattern is in need of application of colors in a number equal to or greater than a predetermined number, a plurality of colors included in the clustered colors may be randomly applied to the obtained pattern.

Further, in the applying, the ratio that each of the clustered colors occupies in the image may be determined, and clustered colors of which ratios are high may be applied to the obtained pattern relatively more than clustered colors of which ratios are low.

Also, in the applying, the ratio that each of the clustered colors occupies in the image may be determined, and in case clustered colors occupying ratios equal to or greater than a predetermined ratio are present, the ratio of each of the clustered colors may be adjusted, and each of the clustered colors of which ratio has been adjusted may be applied to the obtained pattern.

According to the various embodiments of the disclosure as described above, a display apparatus can output an image matched up with the surrounding area of the display apparatus. Accordingly, a display apparatus may function as an interior element, and a user may have an experience wherein it feels like there is no display apparatus.

BRIEF DESCRIPTION OF THE DRAWINGS

The above and other aspects, features, and advantages of particular embodiments of the present disclosure will be more apparent from the following description taken in conjunction with the accompanying drawings, in which.

DETAILED DESCRIPTION

First, as terms used in this specification and the claims, general terms were selected in consideration of the functions described in the disclosure. However, the terms may vary depending on the intention of those skilled in the art who work in the pertinent field, legal or technical interpretation, emergence of new technologies, etc. Also, there are some terms that were designated by the applicant on his own. The meaning of such terms may be interpreted as defined in this specification, and if there is no specific definition of such terms, the terms may be interpreted based on the overall content of this specification and technical knowledge common in the pertinent technical field.

Also, in explaining the disclosure, in case it is identified that detailed explanation of related known functions or features may unnecessarily confuse the gist of the disclosure, the detailed explanation in that regard will be abridged or omitted.

Further, while the embodiments of the disclosure will be described in detail with reference to the following accompanying drawings and the content described in the accompanying drawings, it is not intended that the disclosure is restricted or limited by the embodiments.

Hereinafter, the disclosure will be described in detail with reference to the accompanying drawings.

Figure 1:
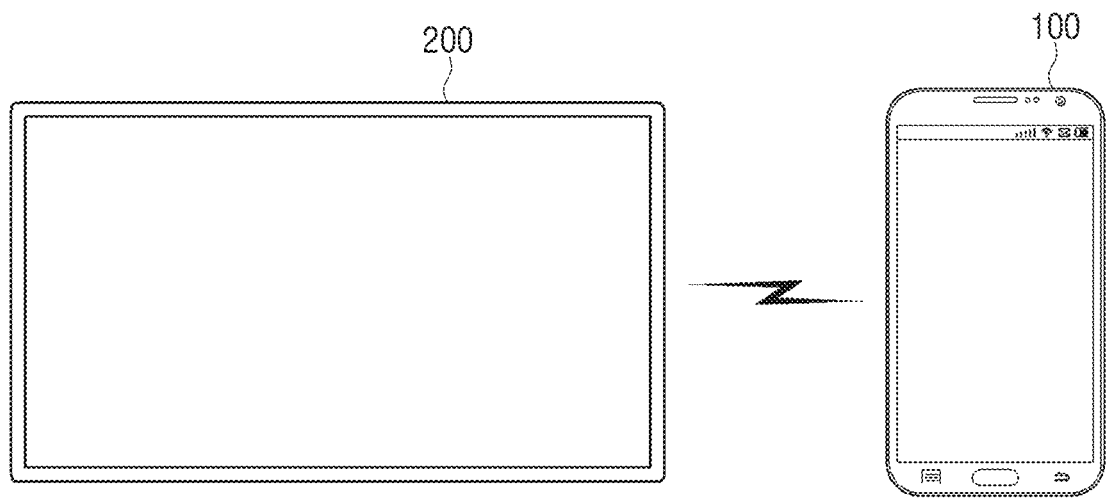
FIG. 1 is a block diagram for illustrating an electronic system according to an embodiment of the disclosure.

FIG. 1 is a block diagram for illustrating an electronic system according to an embodiment of the disclosure.

Referring to FIG. 1, an electronic system 10 according to an embodiment of the disclosure may include an electronic apparatus 100 and a display apparatus 200.

The electronic apparatus 100 may be a user terminal apparatus such as a smartphone, as illustrated in FIG. 1. However, this is merely an example, and the electronic apparatus 100 may be implemented as various electronic apparatuses equipped with a camera, such as a camcorder, a tablet PC, and a smart watch.

The display apparatus 200 may be a smart TV, as illustrated in FIG. 1. However, this is merely an example, and the display apparatus 200 may be implemented as various electronic apparatuses equipped with a display, such as a digital TV, a desktop PC, and a kiosk.

The electronic apparatus 100 and the display apparatus 200 may perform communication and transmit and receive various data.

In particular, the electronic apparatus 100 may transmit an image generated based on at least one of a pattern or a color around the display apparatus 200 to the display apparatus 200.

For this, the electronic apparatus 100 may photograph the area where the display apparatus 200 is located, and obtain an image including the display apparatus 200 and the surrounding area of the display apparatus 200.

Then, the electronic apparatus 100 may analyze the photographed image, and identify the area where the display apparatus 200 is located, and the surrounding area of the display apparatus 200.

Further, the electronic apparatus 100 may generate an image based on at least one of a pattern or a color included in the surrounding area.

Here, a generated image is an image that is matched up with the surrounding area of the display apparatus 200, and may be output through the screen of the display apparatus 200. Hereinafter, for the convenience of explanation, description will be made while referring to an image as above as a visualized image.

When a visualized image as above is displayed on the display apparatus 200, the display apparatus may function as an interior element, and a user may not feel a sense of difference visually with respect to the area where the display apparatus is located and the surrounding area of the display apparatus, and may have an experience where it feels like there is no display apparatus. Detailed description in this regard will be made later.

Meanwhile, in the above, it was described that the electronic apparatus 100 and the display apparatus 200 perform communication directly, but the disclosure is not necessarily limited thereto.

Specifically, the electronic apparatus 100 may perform communication with the display apparatus 200 through an external apparatus (not shown). Here, an external apparatus (not shown) may not only be a set top box, but also various relay apparatuses such as an AP and a router relaying communication between the electronic apparatus 100 and the display apparatus 200. Alternatively, an external apparatus (not shown) may be an external server.

As an example, the electronic apparatus 100 may communicate with an external apparatus (not shown), and transmit a visualized image to the external apparatus (not shown), and the display apparatus 200 may receive the visualized image from the external apparatus (not shown), and display the image.

Figure 2:
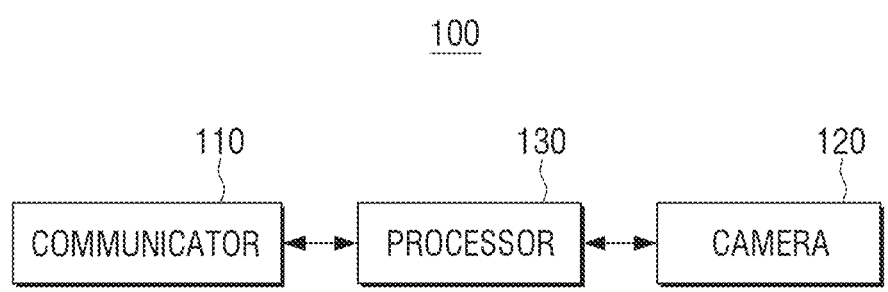
FIG. 2 is a block diagram for illustrating an electronic apparatus according to an embodiment of the disclosure.

FIG. 2 is a block diagram for illustrating an electronic apparatus according to an embodiment of the disclosure.

Referring to FIG. 2, the electronic apparatus 100 according to an embodiment of the disclosure may include a communicator 110, a camera 120, and a processor 130.

The communicator 110 may perform communication with the display apparatus 200 and transmit and receive various data.

In particular, the communicator 110 may transmit a visualized image generated based on at least one of a pattern or a color around the display apparatus 200 to the display apparatus 200.

For this, the communicator 110 may include a wireless communication chip, a Wifi chip, a Bluetooth chip, etc.

The camera 120 may photograph various subjects.

In particular, the camera 120 may photograph the area where the display apparatus 200 is located. Here, the display apparatus 200 may be installed in the form of a picture frame in an area of a wall surface, or installed in the form of a stand in front of a wall surface. Accordingly, an image photographed by the camera 120 may include the display apparatus 200 and the surrounding area of the display apparatus 200.

The camera 120 may be implemented as a dual camera having a plurality of camera modules. However, this is merely an example, and the camera 120 may also be implemented as one camera module.

The processor 130 controls the overall operations of the electronic apparatus 100. For this, the processor 130 may include one or more of a central processing unit (CPU), an application processor (AP), or a communication processor (CP).

Hereinafter, the operations of the processor 130 will be described in detail with reference to FIGS. 3 to 13.

Figure 3:
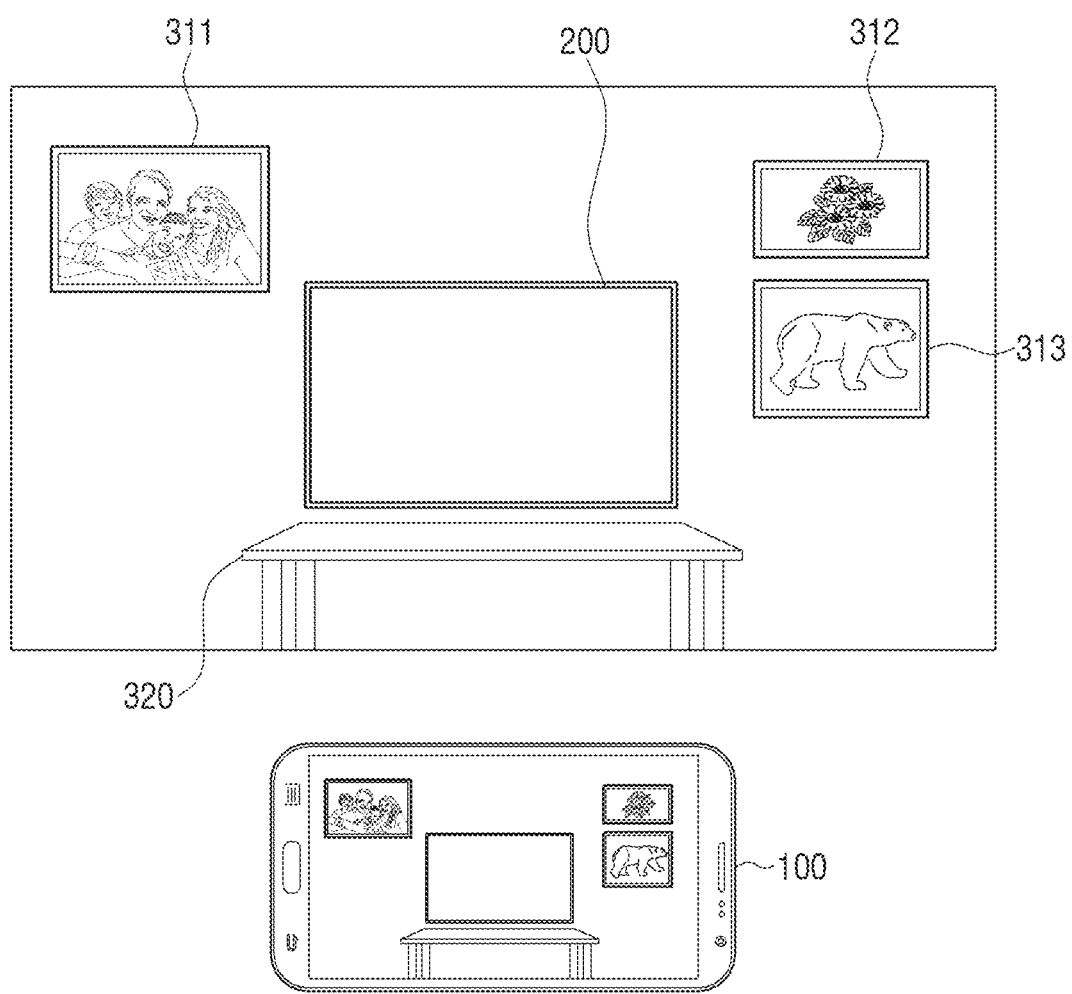
FIG. 3 is a diagram for illustrating an electronic apparatus that photographs a display apparatus according to an embodiment of the disclosure.

FIG. 3 is a diagram for illustrating an electronic apparatus that photographs a display apparatus according to an embodiment of the disclosure.

Referring to FIG. 3, the processor 130 may photograph an area including the display apparatus 200 and the surrounding area of the display apparatus 200 through the camera 120.

As illustrated in FIG. 3, a photographed image may include the display apparatus 200, picture frames 311, 312, 313 around the display apparatus 200, a table 320, etc.

Specifically, when a user input for controlling the camera is received, the processor 130 may photograph an area including the display apparatus 200 and the surrounding area of the display apparatus 200.

Here, a user input for controlling the camera may be performed by various methods. For example, a user input for controlling the camera may be a touch input to a touch screen, or a user voice input to a microphone (not shown) of the electronic apparatus 100.

The processor 130 may analyze the patterns and colors of the remaining areas excluding an area corresponding to the display apparatus 200 in the photographed image.

For this, the processor 130 may first identify the display apparatus 200 and the remaining areas excluding display apparatus 200, i.e., the surrounding area of the display apparatus 200 in the photographed image.

Figure 4:
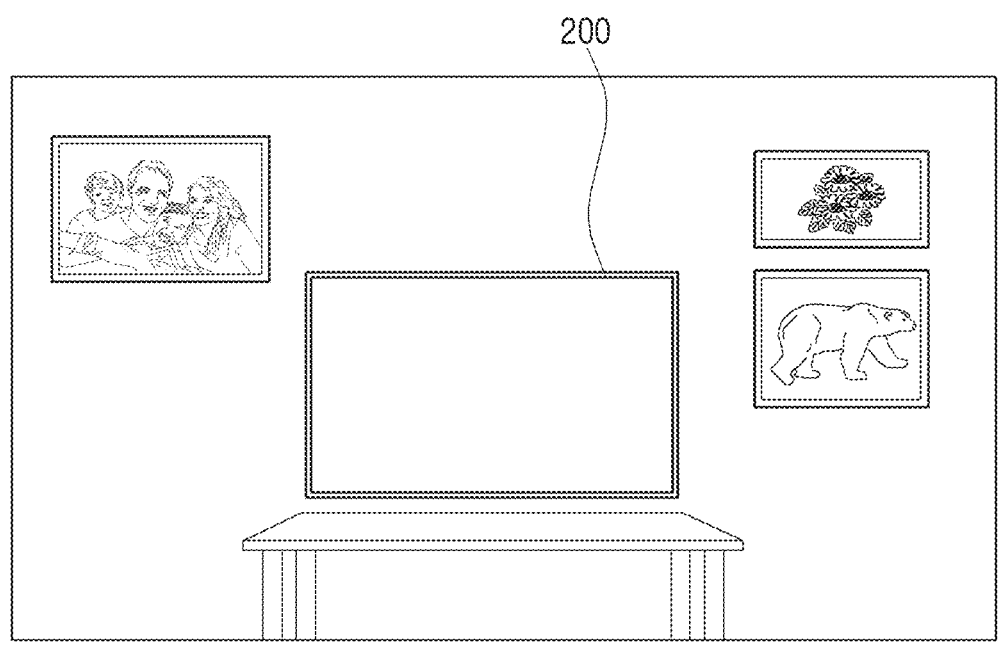
FIG. 4 is a diagram for illustrating an embodiment of identifying a display apparatus and the surrounding area of the display apparatus according to an embodiment of the disclosure.
Figure 4:
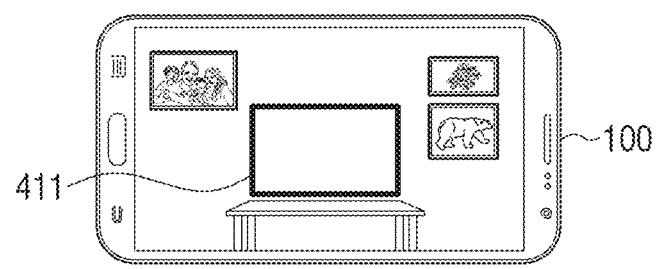
Figure 5:
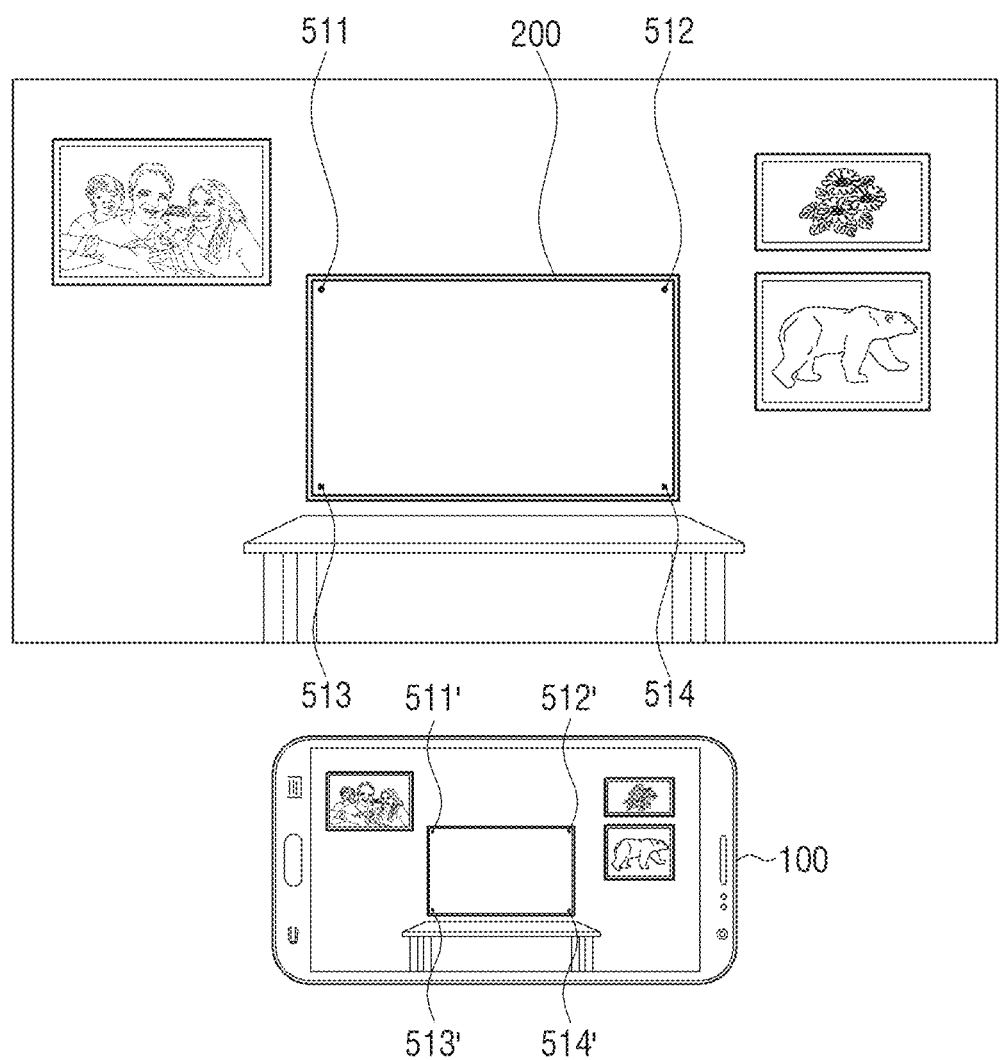
FIG. 5 is a diagram for illustrating an embodiment of identifying a display apparatus and the surrounding area of the display apparatus according to an embodiment of the disclosure.

FIGS. 4 and 5 are diagrams for illustrating an embodiment of identifying a display apparatus and the surrounding area of the display apparatus according to an embodiment of the disclosure.

The processor 130 may identify the display apparatus 200 and the surrounding area of the display apparatus 200 in the photographed image.

For this, when a camera application is executed, the processor 130 may display a guide UI 411 as illustrated in FIG. 4. Here, the guide UI 411 may be a UI for guiding such that the screen of the display apparatus 200 can be included in a specific area.

Afterwards, when an image including the display apparatus 200 and the surrounding area of the display apparatus 200 is photographed according to a user command, the processor 130 may analyze the photographed image, and identify that the area included in the guide UI 411 is the area where the display apparatus 200 is located, and the remaining areas are the surrounding area of the display apparatus 200.

Specifically, the processor 130 may extract the outer contour portion of the display apparatus 200 through the guide UI, and then identify that the area included in the extracted outer contour portion is the area where the display apparatus 200 is located, and the remaining areas are the surrounding area of the display apparatus 200.

As another example, the processor 130 may identify the display apparatus 200 and the surrounding area of the display apparatus 200 by using a marker displayed on the display apparatus 200.

According to a user command, the processor 130 may control the display apparatus 200 to output a marker. Specifically, when a user command for outputting a marker is received, the processor 130 may transmit a signal requesting outputting of a marker to the display apparatus 200. Alternatively, the processor 130 may transmit a signal requesting outputting of a marker to an external apparatus (not shown) such as a set top box, and the display apparatus 200 may output a marker based on a signal requesting outputting of a marker received from the external apparatus (not shown).

In this case, referring to FIG. 5, the display apparatus 200 may display respective markers (511, 512, 513, and 514) in each corner area of the screen.

Then, the processor 130 may photograph an image including the display apparatus 200 where four markers (511', 512', 513', and 514') are displayed as illustrated in FIG. 5 through the camera 120.

Afterwards, the processor 130 may extract the outer contour portion of the display apparatus 200 by using the four markers (511' to 514') included in the photographed image, and then identify the area included in the extracted outer contour portion as the area where the display apparatus 200 is located, and identify the remaining areas as the surrounding area of the display apparatus 200.

Meanwhile, the aforementioned embodiment is an example, and a method of identifying the display apparatus 200 and the surrounding area of the display apparatus 200 is not necessarily limited thereto.

For example, the processor 130 may recognize objects in the form of a square by applying an object recognition algorithm to an image photographed through the camera 120, and identify an object having a predetermined ratio (e.g., a horizontal to vertical ratio of 16:9) among the recognized objects as the area where the display apparatus 200 is located, and identify the remaining areas as the surrounding area of the display apparatus 200.

Figure 6:
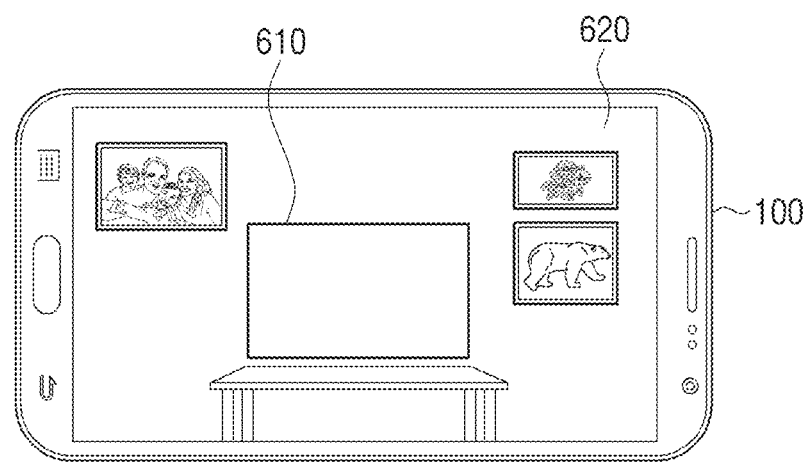
FIG. 6 is a diagram for illustrating an embodiment wherein a display apparatus and the surrounding area of the display apparatus have been identified according to an embodiment of the disclosure.

Accordingly, as illustrated in FIG. 6, the processor 130 may identify each of the area 610 where the display apparatus 200 is located and the remaining areas 620 excluding the display apparatus 200 in the photographed image.

Figure 7:
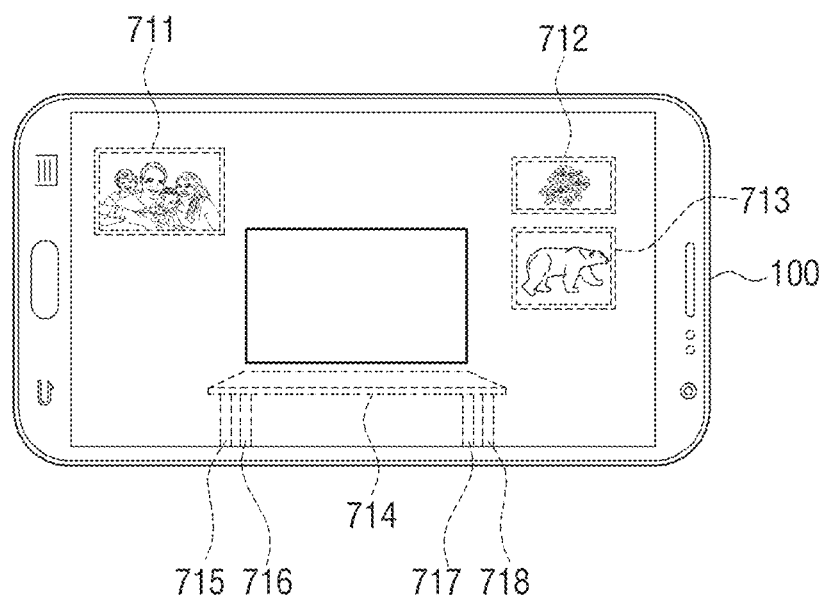
FIG. 7 is a diagram for illustrating an embodiment of analyzing the patterns of the remaining areas excluding a display apparatus according to an embodiment of the disclosure.

FIG. 7 is a diagram for illustrating an embodiment of analyzing the patterns of the remaining areas excluding a display apparatus according to an embodiment of the disclosure.

The processor 130 may analyze the patterns of the remaining areas excluding an area corresponding to the display apparatus 200 in a photographed image.

For this, the processor 130 may first recognize objects in the surrounding area of the display apparatus 200 through an object recognition algorithm.

Here, an object recognition algorithm refers to a technology of detecting outlines included in an image, and thereby recognizing sizes, shapes, etc. of objects. However, this is merely an example, and a method of recognizing objects is not restricted thereto. For example, object recognition may be performed through a deep neural network based on deep learning.

Referring to FIG. 7, the processor 130 may recognize rectangular objects 711, 712, 713, a trapezoid object 714, and objects having vertical stripes 715 to 718 through an object recognition algorithm.

Then, the processor 130 may identify the patterns of the surrounding area of the display apparatus 200 based on the recognized objects of the display apparatus 200.

Specifically, in case there are objects in a specific shape in a number equal to or greater than a predetermined number, the processor 130 may identify the shape as the pattern of the surrounding area of the display apparatus 200. Here, a predetermined number may not only be set in the stage of releasing a product, but it may also be changed according to a user command later. A predetermined number may be set variously such as three, five, etc.

In this embodiment, if it is assumed that a predetermined number is three, as there are three rectangular objects 711, 712, 713, and four objects having vertical stripes 715 to 718, the processor 130 may analyze that the patterns of the surrounding area of the display apparatus 200 are a rectangular pattern and a vertical stripe pattern.

Afterwards, the processor 130 may identify a pattern included in the photographed image by a ratio equal to or greater than a predetermined ratio, among the patterns of the surrounding area of the display apparatus 200.

Here, a predetermined ratio may not only be set in the stage of releasing a product, but it may also be changed according to a user command later. A predetermined ratio may be set variously such as 30%, 50%, etc.

For example, in case a predetermined ratio is 50%, and a rectangular pattern and a vertical stripe pattern are included in the surrounding area of the display apparatus 200 by ratios of 50% and 30% respectively, the processor 130 may identify that the rectangular pattern is a pattern included in the photographed image by a ratio equal to or greater than a predetermined ratio.

Then, the processor 130 may obtain a pattern corresponding to the photographed image based on the pattern included in the photographed image by a ratio equal to or greater than a predetermined ratio.

Specifically, the processor 130 may obtain a pattern of which similarity to a pattern included in the photographed image by a ratio equal to or greater than a predetermined ratio is relatively high among a plurality of pre-stored patterns as a pattern corresponding to the photographed image.

For this, the processor 130 may first identify the similarity between the plurality of pre-stored patterns and the pattern included in the photographed image by a ratio equal to or greater than a predetermined ratio. Here, similarity may be identified by comparison between the shapes of the patterns.

For example, in case a square pattern, a horizontal stripe pattern, a vertical stripe pattern, etc. have been stored in advance, and it is identified that the rectangular pattern is included in the photographed image by a ratio equal to or greater than a predetermined ratio as in this embodiment, the processor 130 may compare each of the square, the horizontal stripe, and the vertical stripe which are the shapes of the plurality of pre-stored patterns with the rectangle which is the shape of the pattern included in the photographed image by a ratio equal to or greater than a predetermined ratio.

Then, if it is identified that the pre-stored square pattern has relatively the highest similarity with the rectangular pattern included in the photographed image by a ratio equal to or greater than a predetermined ratio, the processor 130 may obtain the pre-stored square pattern as a pattern corresponding to the photographed image.

Figure 8:
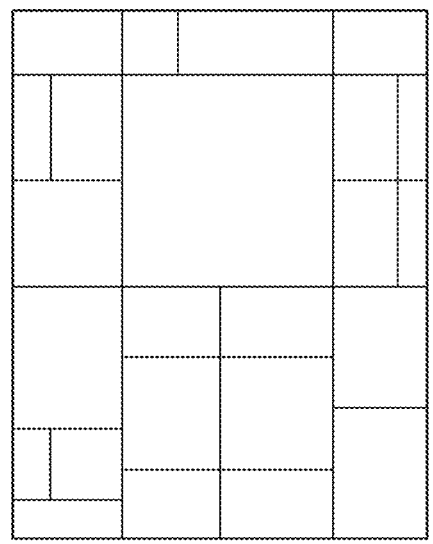
FIG. 8 is a diagram for illustrating a pattern corresponding to a photographed image according to an embodiment of the disclosure.

For example, the processor 130 may obtain a square pattern as in FIG. 8 as a pattern corresponding to the photographed image.

Meanwhile, here, it was described that a pattern among pre-stored patterns is obtained as a pattern corresponding to a photographed image, but a pattern may be a pattern generated by the electronic apparatus 100. Specifically, if a pattern included in a photographed image by a ratio equal to or greater than a predetermined ratio is determined, the processor 130 may generate a new pattern where a plurality of such patterns are combined.

Also, here, an embodiment of obtaining a pattern corresponding to an image photographed by the electronic apparatus 100 was described, but this is just an example.

As another example, a pattern corresponding to a photographed image may be obtained from an external server (not shown). Specifically, the processor 130 may transmit an image including a photographed image or the remaining areas excluding the display apparatus 200 to an external server (not shown), and a pattern corresponding to the photographed image may be analyzed by the external server (not shown), and transmitted to the electronic apparatus 100.

Also, here, it was described that a square pattern is obtained as a pattern corresponding to a photographed image, but a pattern corresponding to a photographed image is not restricted thereto.

Figure 9:
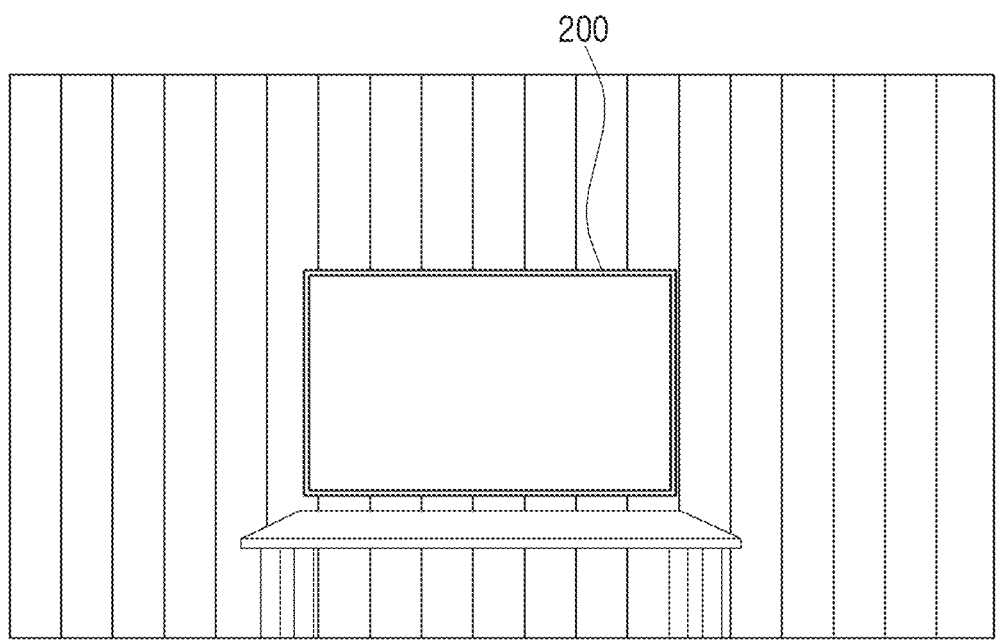
FIG. 9 is a diagram for illustrating a pattern corresponding to a photographed image according to an embodiment of the disclosure.
Figure 9:
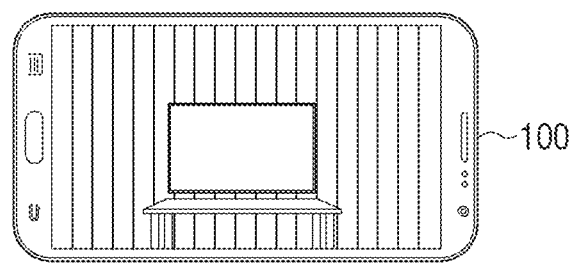
Figure 10:
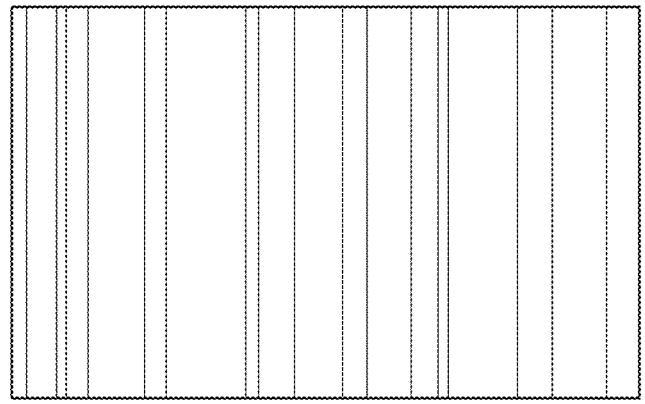
FIG. 10 is a diagram for illustrating a pattern corresponding to a photographed image according to an embodiment of the disclosure.

For example, as illustrated in FIG. 9, in case a vertical stripe pattern is included in the surrounding area of the display apparatus 200 by a ratio equal to or greater than a predetermined ratio, the processor 130 may obtain the vertical stripe pattern as a pattern corresponding to a photographed image, as illustrated in FIG. 10.

Other than the above, a pattern corresponding to a photographed image may be obtained variously according to a pattern included in the photographed image by a ratio equal to or greater than a predetermined ratio (e.g., a circular pattern, a triangular pattern, a curved pattern, etc.).

Figure 11:
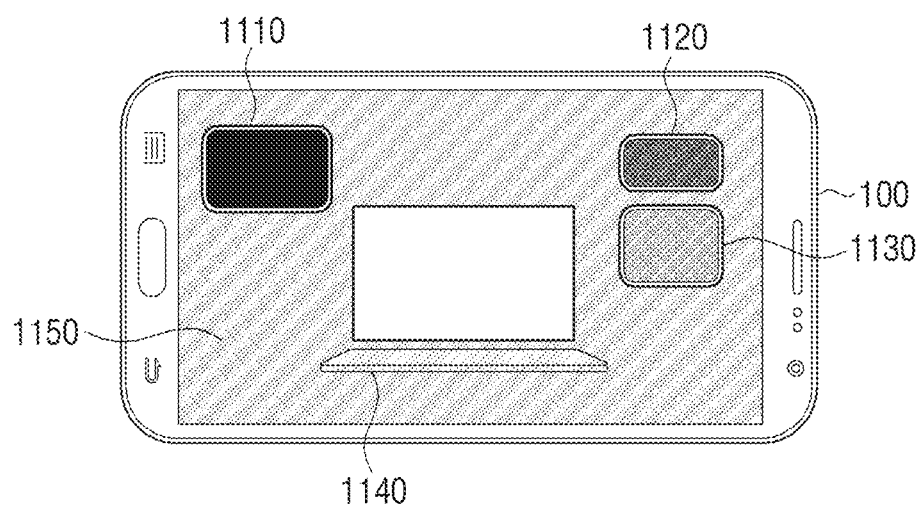
FIG. 11 is a diagram for illustrating an embodiment of clustering colors included in a photographed image according to an embodiment of the disclosure.

FIG. 11 is a diagram for illustrating an embodiment of clustering colors included in a photographed image according to an embodiment of the disclosure.

The processor 130 may cluster colors in the surrounding area of the display apparatus 200. Specifically, the processor 130 may cluster colors in the surrounding area of the display apparatus 200 based on similarity among each color.

For example, referring to FIG. 11, in case it is identified that colors included in an area 1110 where a first picture frame is located are similar to one another, the processor 130 may cluster the colors in the area 1110 where the first picture frame is located. Likewise, in case it is identified that colors included in an area 1120 where a second picture frame is located, an area 1130 where a third picture frame is located, an area 1140 where a table is located, and a remaining background area 1150 are similar to one another respectively, the processor 130 may cluster colors in each area.

Specifically, the processor 130 may cluster colors in the surrounding area of the display apparatus 200 through a K-means algorithm, based on similarity among each color.

Here, a K-means algorithm is an algorithm of gathering input data in clusters in a k number, and the processor 130 may cluster colors in the surrounding area of the display apparatus 200 in a way of minimizing dispersion among colors in the surrounding area of the display apparatus 200 (i.e., a way of minimizing dissimilarity among colors in the surrounding area of the display apparatus 200) through a K-means algorithm.

Meanwhile, similarity among each color may be identified by the similarity of RGB means. Specifically, the processor 130 may identify the RGB means in the surrounding area of the display apparatus 200, and cluster colors in areas where the RGB means are within a predetermined range. However, this is merely an example, and similarity among each color may be identified by various methods. For example, similarity among each color may be identified according to whether a specific value among the values of each of R, G, and B in the surrounding area of the display apparatus 200 is within a predetermined range, or it may also be identified according to whether the luminance value in the surrounding area of the display apparatus 200 is within a predetermined range.

Meanwhile, the processor 130 may cluster colors in the surrounding area of the display apparatus 200 in consideration of a predetermined threshold. Here, a predetermined threshold may not only be set in the stage of releasing a product, but it may also be changed according to a user command later. A predetermined threshold may be set variously such as 30%, 50%, etc.

Specifically, the processor 130 may cluster colors occupying portions equal to or greater than a predetermined threshold in a photographed image, and may not cluster colors occupying portions smaller than a predetermined threshold in a photographed image.

For example, in case a predetermined threshold is 30%, the processor 130 may cluster colors occupying portions equal to or greater than 30% in a photographed image, and may not cluster colors occupying portions smaller than 30% in a photographed image.

This is because colors occupying portions equal to or greater than a predetermined threshold are the primary colors in the surrounding area of the display apparatus 200, and when a visualized image generated based on the primary colors is displayed on the display apparatus 200, the display apparatus 200 can be deemed to be matched up with the surrounding area.

Meanwhile, the aforementioned embodiment of clustering colors in the surrounding area of the display apparatus 200 through a K-means algorithm is just an example, and in the disclosure, colors may be clustered through various technologies of clustering input data in groups in an N number.

As an example, the processor 130 may analyze colors included in a photographed image in units of pixels, and cluster pixels where similarity among the colors is equal to or greater than a predetermined threshold among a plurality of pixels included in the photographed image.

For example, the processor 130 may identify pixels of which RGB means are within 5% among a plurality of pixels included in a photographed image as pixels where similarity is equal to or greater than a predetermined threshold, and cluster the pixels of which RGB means are within 5%.

Figure 12:
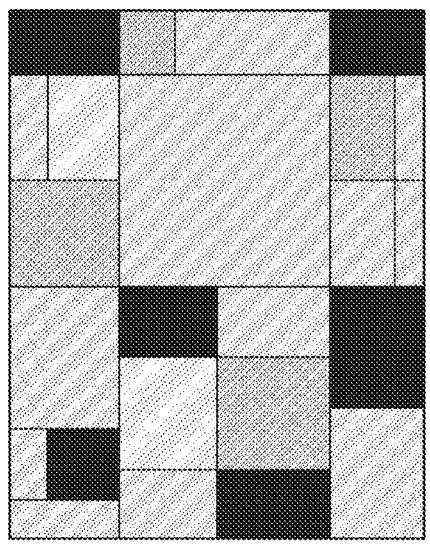
FIG. 12 is a diagram for illustrating an image generated by applying clustered colors to an obtained pattern according to an embodiment of the disclosure.

FIG. 12 is a diagram for illustrating an image generated by applying clustered colors to an obtained pattern according to an embodiment of the disclosure.

The processor 130 may apply clustered colors to an obtained pattern.

For example, in case a pattern as in FIG. 8 described above is obtained as a pattern corresponding to a photographed image, the processor 130 may apply clustered colors to the obtained pattern as in FIG. 12.

Here, the processor 130 may apply clustered colors to the obtained pattern in different ratios, according to the ratio that each of the clustered colors occupies in the photographed image.

Specifically, the processor 130 may identify the ratio that each of the clustered colors occupies in the photographed image, and apply clustered colors of which ratios are high to the obtained pattern relatively more than clustered colors of which ratios are low.

For example, as in FIG. 11, in case the ratio that each of the clustered colors occupies in the photographed image becomes smaller in the order of the background area 1150, the area 1110 where the first picture frame is located, the area 1130 where the third picture frame is located, the area 1140 where the table is located, and the area 1120 where the second picture frame is located, the processor 130 may apply colors clustered correspondingly to the background area 1150 to the obtained pattern in the highest amount, apply colors clustered correspondingly to the area 1110 where the first picture frame is located to the obtained pattern in the next highest amount, apply colors clustered correspondingly to the area 1130 where the third picture frame is located to the obtained pattern in the next highest amount, apply colors clustered correspondingly to the area 1140 where the table is located to the obtained pattern in the next highest amount, and apply colors clustered correspondingly to the area 1120 where the second picture frame is located to the obtained pattern in relatively the least amount, as in FIG. 12.

Afterwards, the processor 130 may control the communicator 110 such that an image generated by applying the clustered colors to the obtained pattern, i.e., a visualized image, is output at the display apparatus 200.

Specifically, the processor 130 may transmit a visualized image to the display apparatus 200 through the communicator 110, and thereby make the visualized image output at the display apparatus 200.

Alternatively, as described above, the processor 130 may communicate with an external apparatus (not shown) such as a set top box, and transmit a visualized image to the external apparatus (not shown), and the display apparatus 200 may receive the visualized image from the external apparatus (not shown), and output the image.

Figure 13:
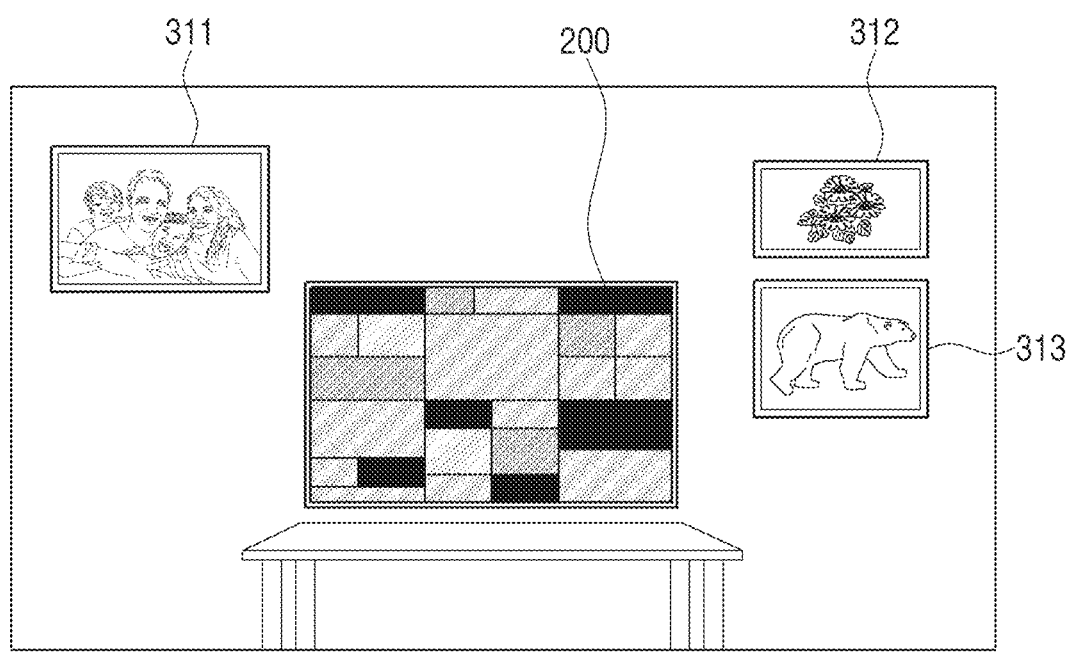
FIG. 13 is a diagram for illustrating a display apparatus wherein a visualized image is displayed according to an embodiment of the disclosure.

Accordingly, on the display apparatus 200, a visualized image may be displayed as in FIG. 13. When such a visualized image is displayed on the display apparatus 200, the display apparatus may be matched up with surrounding objects and function as an interior element, and a user may not feel a sense of difference visually with respect to the area where the display apparatus is located and the surrounding area of the display apparatus. That is, a user may have an experience where it feels like there is no display apparatus in the area where the display apparatus is located.

FIG. 13 is a diagram for illustrating patterns obtained based on directivity according to an embodiment of the disclosure.

The processor 130 may identify locations of patterns included in the surrounding area of the display apparatus 200, based on the display apparatus 200.

Here, locations of patterns may be identified based on virtual line segments.

Figure 14:
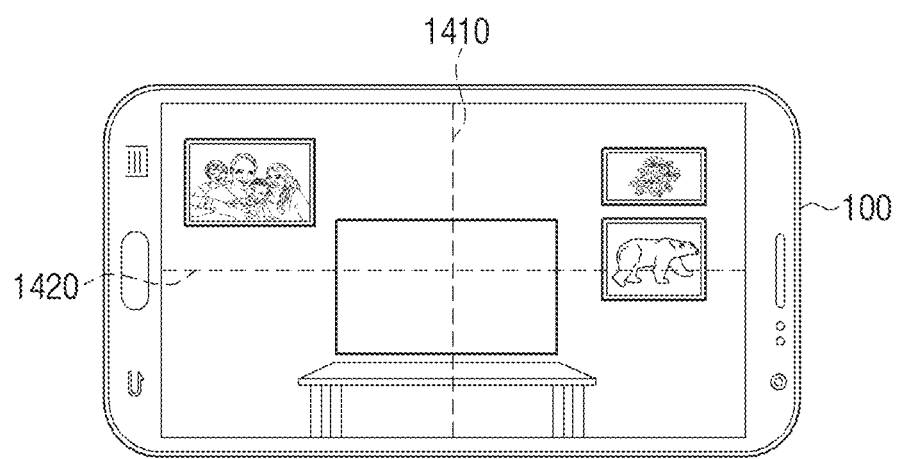
FIG. 14 is a diagram for illustrating an embodiment of identifying locations of patterns included in a surrounding area of a display apparatus according to an embodiment of the disclosure.

As an example, referring to FIG. 14, the processor 130 may identify locations of patterns included in the surrounding area of the display apparatus 200, based on a virtual horizontal line segment 1420 and a virtual vertical line segment 1410 passing through the display apparatus 200.

In this embodiment, the processor 130 may identify that a rectangular pattern is located in the upper left area, a rectangular pattern is located in the upper right area, a rectangular pattern is located in the right area, and a trapezoid pattern and a vertical stripe pattern are located in the lower central area, based on the display apparatus 200.

However, this is merely an example, and the processor 130 may identify locations of patterns through various methods.

As an example, the processor 130 may identify locations of patterns included in the surrounding area of the display apparatus 200 based on the display apparatus 200, based on the coordinate of each pixel included in a photographed image.

Afterwards, the processor 130 may obtain a pattern corresponding to the photographed image in further consideration of the locations of the patterns included in the photographed image.

That is, the processor 130 may analyze the patterns of each area located in different directions based on the display apparatus 200, and obtain a pattern corresponding to the photographed image based on the patterns included in the photographed image by ratios equal to or greater than a predetermined ratio among the patterns of each area and the locations of the patterns included by ratios equal to or greater than a predetermined ratio.

Figure 15:
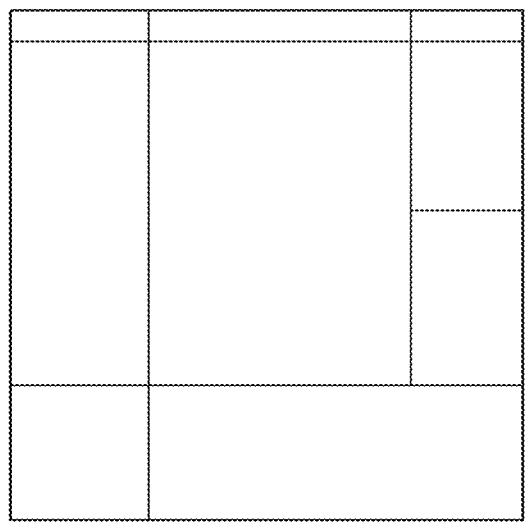
FIG. 15 is a diagram for illustrating a pattern obtained based on locations of patterns included in a photographed image according to an embodiment of the disclosure.

For example, in FIG. 14, in case the rectangular patterns in the upper left area, the upper right area, and the right area and the trapezoid pattern in the lower central area based on the display apparatus 200 are patterns occupying ratios equal to or greater than a predetermined ratio, the processor 130 may obtain a pattern where the sizes of the squares in the upper left area, the upper right area, the right area, and the lower central area are relatively bigger than the sizes of the squares in the other areas, among pre-stored square patterns, as a pattern corresponding to the photographed image, as in FIG. 15.

Accordingly, a pattern that is more correlated with the surrounding area of the display apparatus 200 can be obtained.

Figure 16:
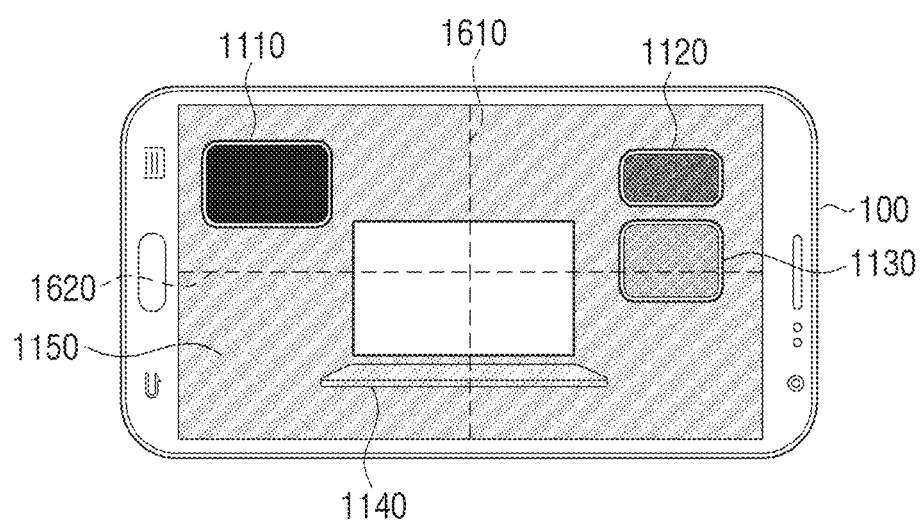
FIG. 16 is a diagram for illustrating an embodiment of identifying locations of clusters included in a photographed image according to an embodiment of the disclosure.

FIG. 16 is a diagram for illustrating an embodiment of identifying locations of clusters included in a photographed image according to an embodiment of the disclosure.

The processor 130 may identify areas where clustered colors are located based on the display apparatus 200.

Here, locations of patterns may be identified based on virtual line segments.

As an example, referring to FIG. 16, the processor 130 may identify areas where clustered colors are located based on the display apparatus 200, based on a virtual horizontal line segment 1620 and a virtual vertical line segment 1610 passing through the display apparatus 200.

In this embodiment, the processor 130 may identify that a first cluster is located in the upper left area, a second cluster is located in the upper right area, a third cluster is located in the right area, a fourth cluster is located in the lower central area, and a fifth cluster is located in the remaining areas based on the display apparatus 200.

However, this is merely an example, and the processor 130 may identify areas where clustered colors are located through various methods.

As an example, the processor 130 may identify areas where clustered colors are located in the surrounding area of the display apparatus 200 based on the display apparatus 200, based on the coordinate of each pixel included in a photographed image.

Afterwards, the processor 130 may apply clustered colors to an obtained pattern in further consideration of the location of each cluster included in the photographed image.

That is, the processor 130 may analyze the colors of each area located in different directions based on the display apparatus 200, and cluster colors included in the photographed image based on similarity between the colors of each area, and apply the clustered colors to the obtained pattern based on the areas where the clustered colors are located based on the display apparatus 200.

Figure 17:
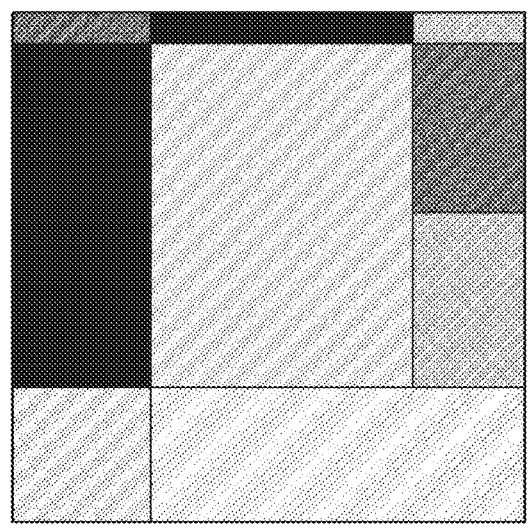
FIG. 17 is a diagram for illustrating an embodiment of applying clustered colors to an obtained pattern based on locations of clusters according to an embodiment of the disclosure.

For example, as in FIG. 16, in a state where it is identified that a first cluster is located in the upper left area, a second cluster is located in the upper right area, a third cluster is located in the right area, a fourth cluster is located in the lower central area, and a fifth cluster is located in the remaining areas based on the display apparatus 200, in case a pattern as in FIG. 15 is obtained, the processor 130 may apply a color corresponding to the first cluster in the upper left area, apply a color corresponding to the second cluster in the upper right area, apply a color corresponding to the third cluster in the right area, apply a color corresponding to the fourth cluster in the lower central area, and apply a color corresponding to the fifth cluster in the remaining areas, as in FIG. 17.

Accordingly, the electronic apparatus 100 according to an embodiment of the disclosure may generate a visualized image that is matched up with the surrounding area of the display apparatus 200.

Figure 18:
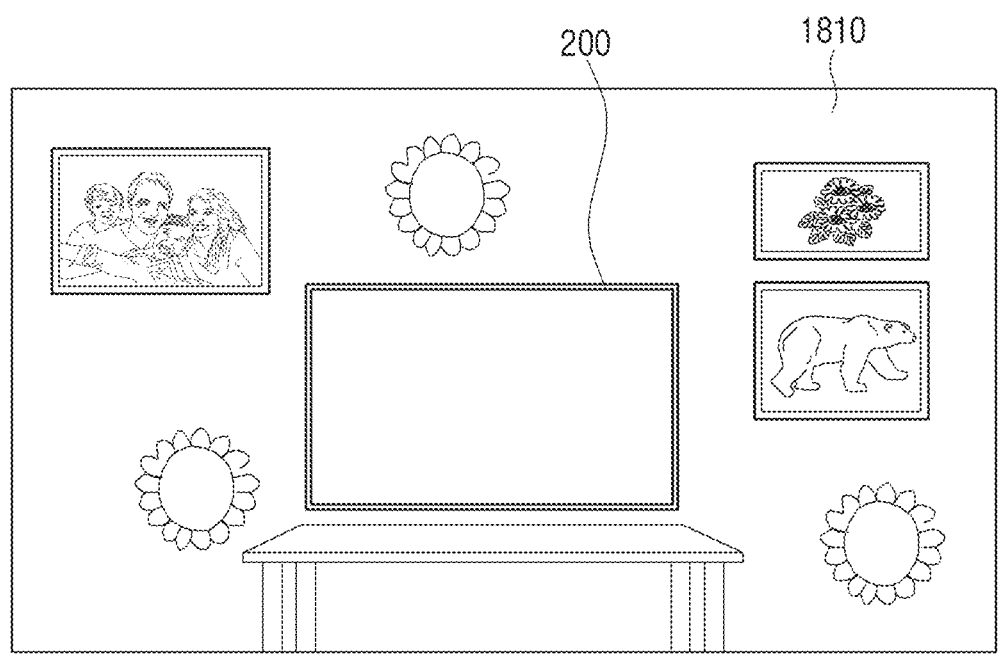
FIG. 18 is a diagram for illustrating an embodiment of obtaining a pattern corresponding to a photographed image according to an embodiment of the disclosure.
Figure 18:
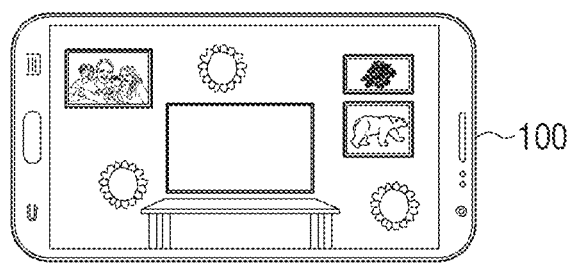
Figure 19:
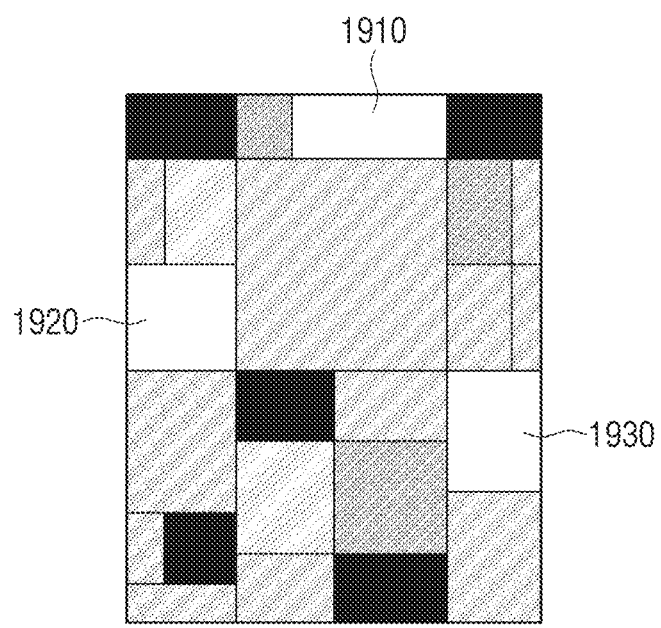
FIG. 19 is a diagram for illustrating an embodiment of obtaining a pattern corresponding to a photographed image according to an embodiment of the disclosure.

FIGS. 18 and 19 are diagrams for illustrating an embodiment of obtaining a pattern corresponding to a photographed image according to an embodiment of the disclosure.

As described above, the processor 130 may obtain a pattern of which similarity to patterns included in a photographed image by ratios equal to or greater than a predetermined ratio is relatively high among a plurality of pre-stored patterns as a pattern corresponding to the photographed image.

For example, the processor 130 may obtain a square pattern as in FIG. 8 as a pattern corresponding to the photographed image.

Meanwhile, in case a pattern different from a plurality of pre-stored patterns is included in the photographed image, the processor 130 may additionally cluster the color of the different pattern. Here, a different pattern may be a pattern included in the photographed image by a ratio smaller than a predetermined ratio. This reflects that, in the case of a pattern different from a plurality of pre-stored patterns, the different pattern may be deemed as a pattern that becomes a key point of the surrounding are of the display apparatus 200.

For example, as illustrated in FIG. 18, in case a flower-shaped object 1810 which is a different pattern from a plurality of pre-stored patterns is included in an image photographed through a camera 120, the processor 130 may additionally cluster the color of the flower-shaped object 1810.

Then, the processor 130 may apply the aforementioned at least one clustered color and the additionally clustered color to an obtained pattern.

For example, in case the color of the flower-shaped object 1810 is yellow, the processor 130 may additionally apply a yellow color to at least one area 1910, 1920, 1930 of the obtained pattern, as illustrated in FIG. 19.

Figure 20:
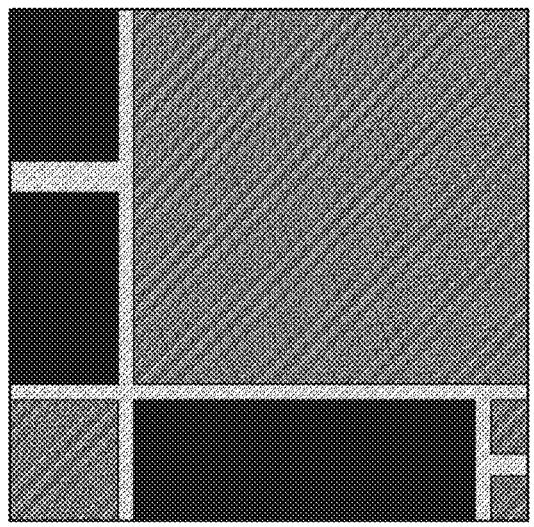
FIG. 20 is a diagram for illustrating an embodiment of applying clustered colors to a pattern according to an embodiment of the disclosure.
Figure 21:
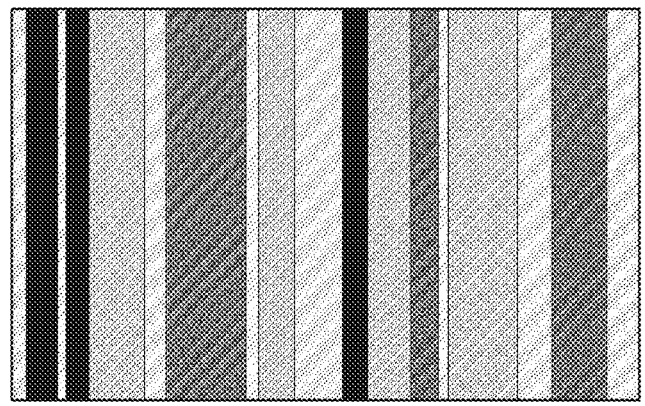
FIG. 21 is a diagram for illustrating an embodiment of applying clustered colors to a pattern according to an embodiment of the disclosure.

FIGS. 20 and 21 are diagrams for illustrating an embodiment of applying clustered colors to a pattern according to an embodiment of the disclosure.

The processor 130 may apply clustered colors to a pattern differently, depending on the number of colors that the obtained pattern needs.

Specifically, in case the obtained pattern needs application of colors in a number smaller than a predetermined number, the processor 130 may analyze colors occupying ratios equal to or greater than a predetermined ratio among a plurality of colors included in clustered colors, and apply colors occupying ratios equal to or greater than a predetermined ratio to the obtained pattern.

Here, a predetermined number may not only be set in the stage of releasing a product, but it may also be changed according to a user command later. A predetermined number may be set variously such as 10, 20, etc.

Also, the number of colors that an obtained pattern needs may be identified depending on the number of closed areas included in the pattern. Here, closed areas may not only be polygons such as squares, but also straight lines, curved lines, etc.

For example, in case a predetermined number is 10, and an obtained pattern is a pattern including eight squares as illustrated in FIG. 20, as this is a case where an obtained pattern needs application of colors in a number smaller than a predetermined number, the processor 130 may apply colors occupying ratios equal to or greater than a predetermined ratio among a plurality of colors included in clustered colors to the obtained pattern.

Meanwhile, a predetermined ratio may not only be set in the stage of releasing a product, but it may also be changed according to a user command later. A predetermined ratio may be set variously such as 50%, 80%, etc.

For example, in case a predetermined ratio is 50%, and the RGB means of a plurality of colors included in a specific cluster are 50 to 60, and colors of which RGB means correspond to 55 among the plurality of colors are included in the cluster as much as 50% or more, the processor 130 may apply the colors of which RGB means correspond to 55 to an obtained pattern.

Likewise, the processor 130 may analyze colors occupying ratios equal to or greater than a predetermined ratio among a plurality of colors included in another cluster, and apply the colors occupying ratios equal to or greater than a predetermined ratio to an obtained pattern.

Meanwhile, in case an obtained pattern needs application of colors in a number equal to or greater than a predetermined number, the processor 130 may apply a plurality of colors included in clustered colors randomly to the obtained pattern.

For example, in case a predetermined number is 10, and an obtained pattern is a pattern including several vertical stripes, as illustrated in FIG. 21, as this is a case where an obtained pattern needs application of colors in a number equal to or greater than a predetermined number, the processor 130 may apply a plurality of colors included in clustered colors randomly to the obtained pattern.

For example, in case the RGB means of a plurality of colors included in a specific cluster are 50 to 60, the processor 130 may apply the colors of which RGB means are between 50 and 60 randomly to an obtained pattern.

Figure 22:
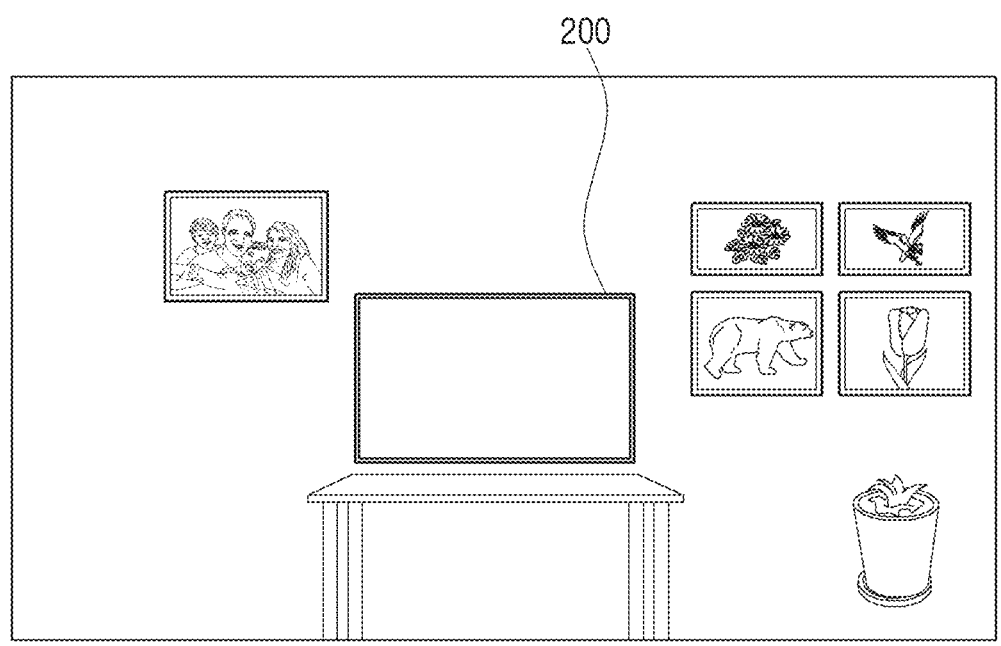
FIG. 22 is a diagram for illustrating an embodiment of obtaining different patterns according to photographing locations according to an embodiment of the disclosure.
Figure 22:
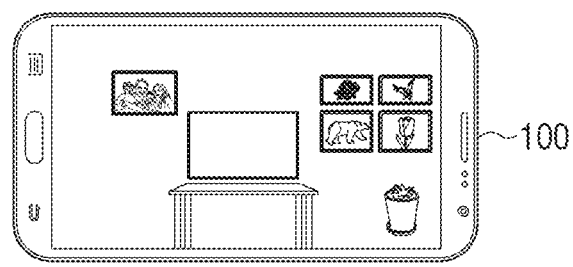
Figure 23:
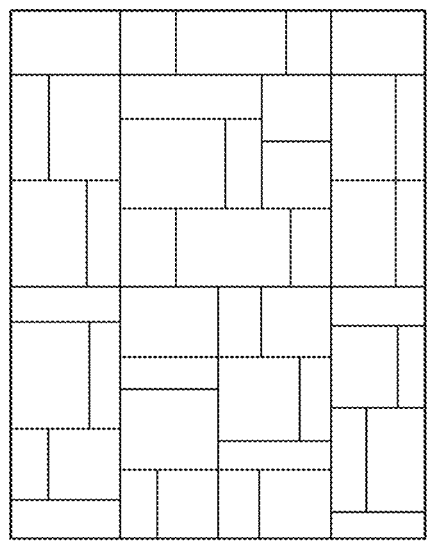
FIG. 23 is a diagram for illustrating an embodiment of obtaining different patterns according to photographing locations according to an embodiment of the disclosure.

FIGS. 22 and 23 are diagrams for illustrating an embodiment of obtaining different patterns according to photographing locations according to an embodiment of the disclosure.

The processor 130 may obtain different patterns according to photographing locations.

FIG. 22 is a diagram illustrating a case of photographing the display apparatus 200 from a relatively far distance compared to FIG. 3, according to an embodiment of the disclosure. Here, as illustrated in FIG. 22, the sizes of the picture frame, the table, etc. included in the image photographed through the camera 120 may be relatively small, compared to FIG. 3.

In this case, the processor 130 may obtain a pattern different from patterns obtained from an image as in FIG. 3 as a pattern corresponding to the photographed image.

Specifically, the processor 130 may obtain an image corresponding to the photographed image in consideration of the sizes of the patterns included in the photographed image.

That is, the processor 130 may obtain a pattern consisting of a square in a relatively small size among a plurality of pre-stored square patterns as an image corresponding to the photographed image.

For example, as illustrated in FIG. 23, the processor 130 may obtain a pattern consisting of a square in a relatively small size compared to patterns obtained in an image as in FIG. 3 as a pattern corresponding to the photographed image.

Accordingly, a pattern that suits a user need can be obtained.

Figure 24A:
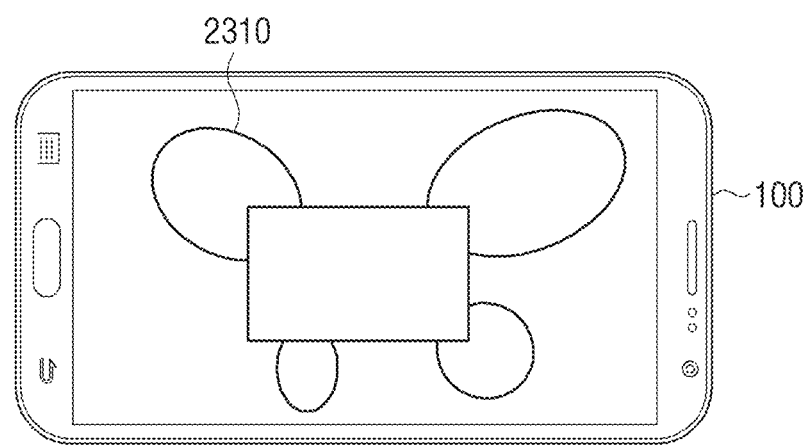
FIG. 24A is a diagram for illustrating an embodiment of clustering colors according to an embodiment of the disclosure.
Figure 24B:
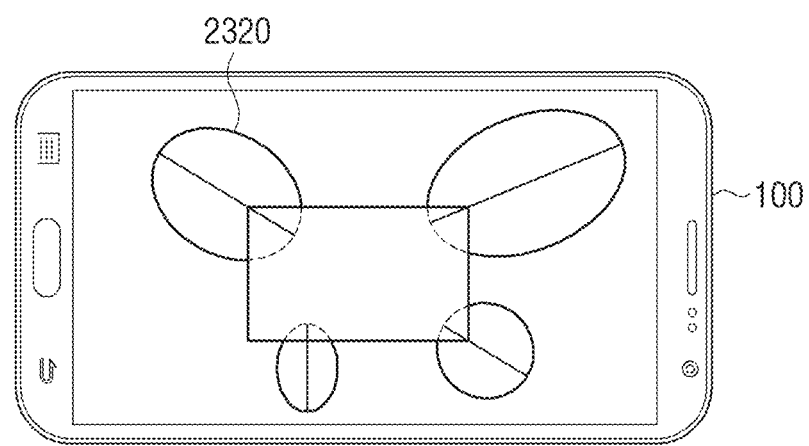
FIG. 24B is a diagram for illustrating an embodiment of clustering colors according to an embodiment of the disclosure.

FIGS. 24A and 24B are diagrams for illustrating an embodiment of clustering colors according to an embodiment of the disclosure.

An image photographed by the camera 120 may include an area covered by the display apparatus 200.

In this case, in an area 2310 where colors are clustered, the area covered by the display apparatus 200 is not included, as illustrated in FIG. 24A.

In this case, the processor 130 may cluster the area covered by the display apparatus 200, in consideration of the long axis of the area 2310 where colors are clustered.

Specifically, as illustrated in FIG. 24B, the processor 130 may identify a long axis passing through the central point of the area 2320 where colors are clustered, and cluster the area covered by the display apparatus 200 based on the long axis.

Accordingly, the electronic apparatus 100 according to an embodiment of the disclosure may cluster colors in a photographed image in consideration of a rear area of the display apparatus 200 not included in the photographed image, and thereby cluster colors to correspond to the actual ratios of colors in the surrounding area of the display apparatus 200.

Figure 25:
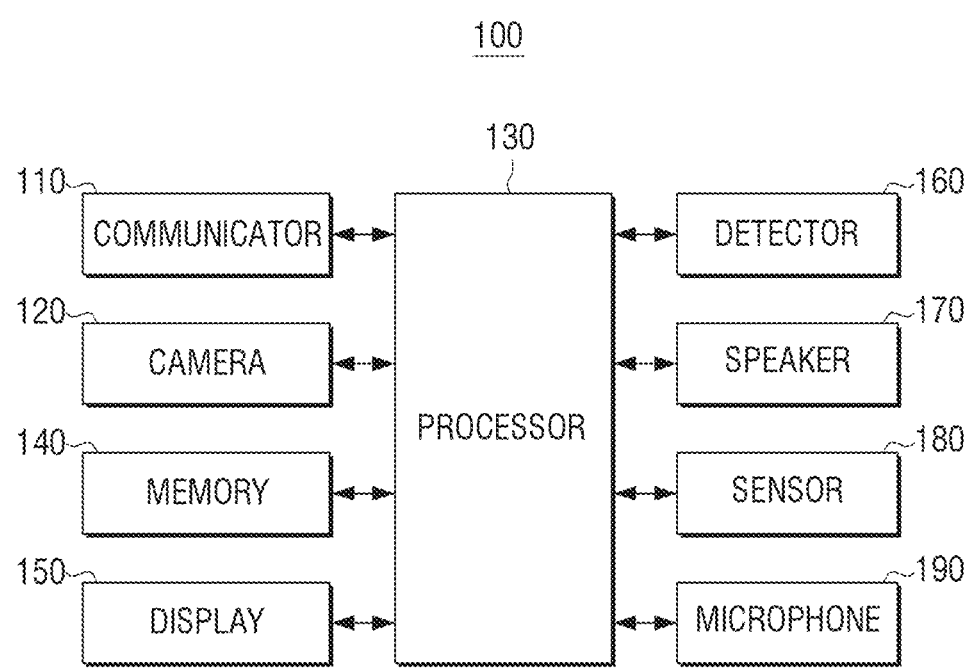
FIG. 25 is a detailed block diagram for illustrating an electronic apparatus according to an embodiment of the disclosure.

FIG. 25 is a detailed block diagram for illustrating an electronic apparatus according to an embodiment of the disclosure.

Referring to FIG. 25, the electronic apparatus 100 according to an embodiment of the disclosure may include a communicator 110, a camera 120, a processor 130, a memory 140, a display 150, a detector 160, a speaker 170, a sensor 180, and a microphone 190. Hereinafter, description with respect to portions that overlap with the aforementioned portions will be abridged or omitted.

The memory 140 stores various modules for operating the electronic apparatus 100. For example, in the memory 140, software including a base module, a sensing module, a communication module, a presentation module, a web browser module, and a service module may be stored. Here, a base module is a basic module that processes signals transmitted from each hardware included in the electronic apparatus 100 and transmits the signals to a higher level layer module. A sensing module is a module that collects information from various sensors, and analyzes and manages the collected information, and may include a face recognition module, a voice recognition module, a motion recognition module, an NFC recognition module, an object recognition module, etc. A presentation module is a module for constituting a display screen, and may include a UI and a UI rendering module performing graphic processing. A communication module is a module for performing communication with an external apparatus. A web browser module means a module that performs web browsing and accesses a web server. A service module is a module including various applications for providing various services.

The display 150 may display various images. In particular, the display 150 may display an image photographed by the camera 120. Also, the display 150 may display a guide UI for identifying the display apparatus 200 in a photographed image.

The display 150 as described above may be implemented as displays in various forms, such as a liquid crystal display (LCD) and a plasma display panel (PDP). In the display 150, driving circuits that may be implemented in forms such as an a-si TFT, a low temperature poly silicon (LTPS) TFT, an organic TFT (OTFT), a backlight unit, etc. may also be included together. Meanwhile, the display 150 may be combined with a touch detector, and implemented as a touch screen.

The detector 160 may be implemented as various detection sensors for detecting user commands. For example, the detector 160 may include a touch detector.

The speaker 170 is a component outputting various audio data for which various processing works such as decoding or amplification, and noise filtering were performed by an audio processor (not shown). Also, the speaker 170 may output various notification sounds or voice messages. According to an embodiment of the disclosure, the speaker 170 may output audio when an image is photographed by the camera 120.

The sensor 180 may detect movements of the electronic apparatus 100. Specifically, the sensor 180 may be implemented as an acceleration sensor, a gyro sensor, or a geomagnetic sensor, and detect movements of the electronic apparatus 100.

Also, the sensor 180 may detect illumination around the electronic apparatus 100. Specifically, the sensor 180 may be implemented as an illumination sensor, and detect illumination around the electronic apparatus 100, and the direction, the brightness, etc. of external light incident on the electronic apparatus 100.

The microphone 190 may receive a user voice. Here, a user voice may be various voices such as a user voice for controlling a camera and a user voice for outputting a visualized image on the display apparatus 200.

The processor 130 controls the overall operations of the electronic apparatus 100.

Also, the processor 130 may correct a visualized image based on the surrounding illuminance detected by the sensor 180.

Specifically, the processor 130 may correct at least one of the color temperature and brightness of a visualized image, based on at least one of the color temperature information and brightness information of external light detected by an illumination sensor.

For example, in case it is identified that the luminous intensity of external light is dark based on the brightness information obtained from an illumination sensor, the processor 130 may adjust the entire brightness of a visualized image to be dark. Accordingly, a visualized image displayed on the display apparatus 200 may be matched up with the actual background area around the display apparatus 200.

If a user voice for displaying a visualized image is received through the microphone 190, the processor 130 may control the communicator 110 such that the visualized image can be output at the display apparatus 200. Specifically, if a user voice for displaying a visualized image is received through the microphone 190, the processor 130 may convert the user voice into a text through a speech to text (STT) algorithm. Then, the processor 130 may analyze the converted text and control the camera 120 to perform photographing, and generate a visualized image from the image photographed through the camera, and control the communicator 110 such that the visualized image can be output at the display apparatus 200.

Meanwhile, the processor 130 may identify the ratio that each of the clustered colors occupies in the photographed image, and in case there are clustered colors occupying ratios equal to or greater than a predetermined ratio, the processor 130 may adjust the ratio of each of the clustered colors, and apply each of the clustered colors of which ratio has been adjusted to an obtained pattern.

For example, in case the ratio that the first cluster occupies in the photographed image is 75%, the ratio that the second cluster occupies in the photographed image is 15%, the ratio that the third cluster occupies in the photographed image is 10%, and a predetermined ratio is 50%, the processor 130 may adjust the ratio of the first cluster which is a cluster occupying a ratio equal to or greater than a predetermined ratio to 50%.

Also, the processor 130 may adjust the ratio of each of the second cluster and the third cluster in the remaining ratio of 50%. In this embodiment, the second cluster and the third cluster have ratios of 3:2 before adjustment. Thus, to maintain the ratios of 3:2 after adjustment, the ratio of the second cluster may be adjusted to 30%, and the ratio of the third cluster may be adjusted to 20%.

Accordingly, ultimately, the processor 130 may generate a visualized image by using the first cluster in a ratio of 50%, the second cluster in a ratio of 30%, and the third cluster in a ratio of 20%. That is, the processor 130 may generate a visualized image by applying 50% of the color corresponding to the first cluster, 30% of the color corresponding to the second cluster, and 20% of the color corresponding to the third cluster to an obtained pattern.

As described above, according to the disclosure, by adjusting the ratios of clusters such that the color of a specific cluster is not included too much, an image matched up with the surrounding area of the display apparatus 200 can be generated.

Meanwhile, in applying clustered colors to an obtained pattern, the processor 130 may perform image processing on the boundary surface of each color included in the pattern. Specifically, the processor 130 may perform blending processing on the boundary surface of each color. Accordingly, a natural visualized image can be generated.

Figure 26:
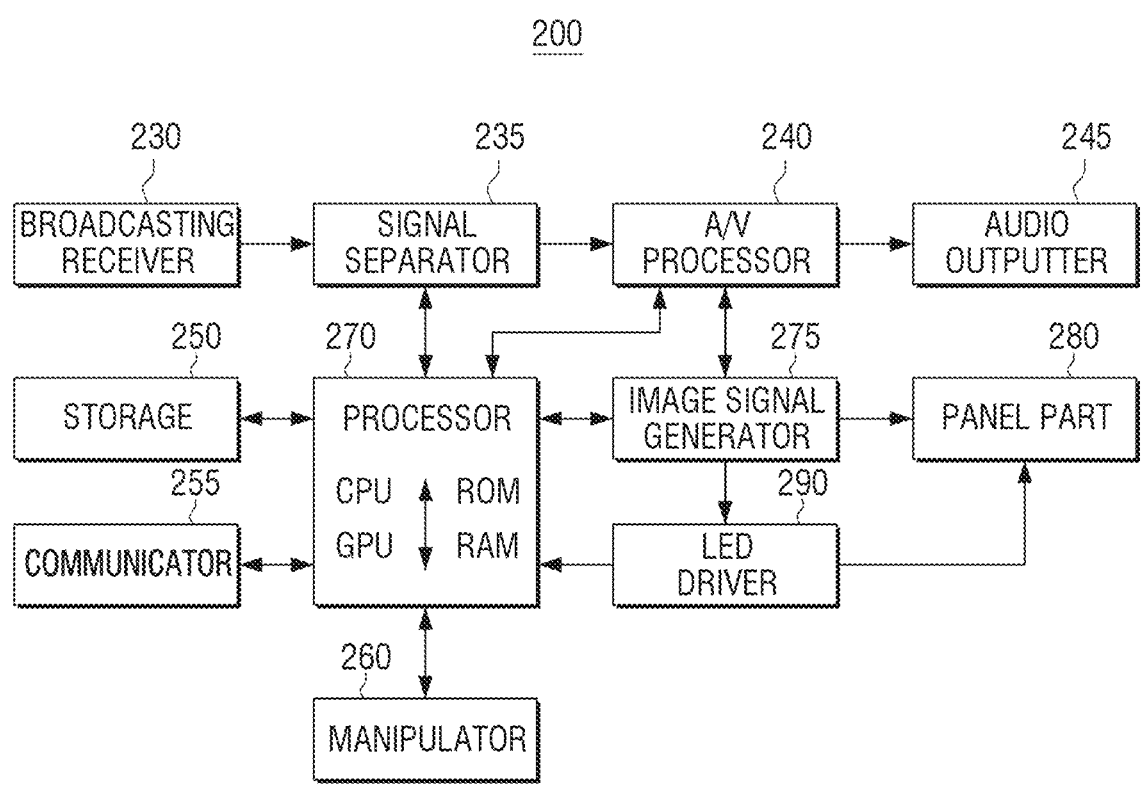
FIG. 26 is a detailed block diagram for illustrating a display apparatus according to an embodiment of the disclosure.

FIG. 26 is a detailed block diagram for illustrating a display apparatus according to an embodiment of the disclosure.

Referring to FIG. 26, the display apparatus 200 according to an embodiment of the disclosure may include a broadcasting receiver 230, a signal separator 235, an A/V processor 240, an audio outputter 245, a storage 250, a communicator 255, a manipulator 260, a processor 270, an image signal generator 275, a panel part 280, and an LED driver 290.

The broadcasting receiver 230 may receive broadcasting by wire or wirelessly from a broadcasting station or a satellite. Here, the broadcasting receiver 230 may be implemented as a tuner.

The signal separator 235 separates signals received from the broadcasting receiver 230 into an image signal, an audio signal, and an additional information signal. Then, the signal separator 235 transmits the image signal and the audio signal to the A/V processor 240.

The A/V processor 240 performs signal processing such as video decoding, video scaling, and audio decoding with respect to the image signal and the audio signal input from the broadcasting receiver 230 and the storage 250. Then, the A/V processor 240 transmits the image signal to the image signal generator 275, and transmits the audio signal to the audio outputter 245.

The audio outputter 245 may convert the audio signal received from the A/V processor 240 into sound, and output the sound through the speaker (not shown).

The image signal generator 275 generates a graphic user interface (GUI). Then, the image signal generator 275 adds the generated GUI to an image received from the A/V processor 240. Further, the image signal generator 275 transmits an image signal corresponding to the image to which the GUI was added to the panel part 280. Accordingly, the panel part 280 may display various information provided at the display apparatus 200 and the image transmitted from the image signal generator 275.

Then, the image signal generator 275 may extract brightness information corresponding to the image signal, and generate a dimming signal corresponding to the extracted brightness information. Further, the image signal generator 275 may provide the generated dimming signal to the panel part 280. Such a dimming signal may be a PWM signal. Meanwhile, in this embodiment, it was described that a dimming signal is generated at the image signal generator 275 and is provided to the panel part 280, but the panel part 280 may generate a dimming signal by itself.

The panel part 280 displays images. Such a panel part 280 may be implemented as displays in various forms, such as a liquid crystal display (LCD) and an organic light emitting diodes (OLED) display. In the panel part 280, driving circuits that may be implemented in forms such as an a-si TFT, a low temperature poly silicon (LTPS) TFT, an organic TFT (OTFT), a backlight unit, etc. may also be included together. Meanwhile, the panel part 280 may be combined with a touch detector, and implemented as a touch screen.

The storage 250 may store an image content. Specifically, the storage 250 may receive an image content where an image and audio are compressed from the A/V processor 240, and store the content. Meanwhile, the storage 250 may be implemented as a hard disc, a non-volatile memory, a volatile memory, etc.

The manipulator 260 may be implemented as a touch screen, a touch pad, a key button, a key pad, etc.

The communicator 255 is a component that performs communication with various types of external devices according to various types of communication methods. The communicator 255 may include a Wifi chip and a Bluetooth chip. The processor 270 may perform communication with various types of external devices by using the communicator 255. In particular, the communicator 255 may perform communication with the electronic apparatus 100.

Meanwhile, the display apparatus 200 may further include a USB port to which a USB connector can be connected, or various external input ports for connecting with various external terminals such as a headset, a mouse, and a LAN, a DMB chip that receives a digital multimedia broadcasting (DMB) signal and processes the signal, etc.

Also, the display apparatus 200 may further include a power supplier (not shown) and a sensing part (not shown), in addition to the components illustrated in FIG. 26. The power supplier provides power to each component in the display apparatus 200. The sensing part may include various sensing apparatuses such as a camera and a movement detector.

In addition, the display apparatus 200 may further include an interface (not shown) that can be connected with an image providing apparatus such as a set top box. Here, an interface may be a high-definition multimedia interface (HDMI) input terminal, a component input terminal, an RGB terminal, a DVI terminal, a DP terminal, a thunderbolt terminal, or a USB input terminal, etc. Accordingly, the display apparatus 200 may receive a broadcasting signal, an image signal for a content, an audio signal, etc. from an image providing apparatus such as a set top box through the interface (not shown).

Also, the display apparatus 200 may process an image signal received from an image providing apparatus through the interface and display an image through the panel part 280, convert the received audio signal to sound, and output the sound through a speaker (not shown).

Further, the display apparatus 200 may further include a microphone (not shown) that can receive a user voice. Here, a user voice may be various voices such as a voice for controlling the camera of the electronic apparatus 100 and a voice for displaying a visualized image on the panel part 280.

The processor 270 controls the overall operations of the display apparatus 200. The processor 270 may include a CPU, a GPU, a ROM, and a RAM, as illustrated in FIG. 16.

Also, the processor 270 may control the image signal generator 275 and the panel part 280 such that an image according to a control command input through the manipulator 260 is displayed.

In particular, when a user voice for displaying a visualized image is received through a microphone (not shown), the processor 270 may control the panel part 280 to display the visualized image received from the electronic apparatus 100. Specifically, when a user voice for displaying a visualized image is received through a microphone (not shown), the processor 270 may convert the user voice into a text through a speech to text (STT) algorithm, and control the panel part 280 to display the visualized image received from the electronic apparatus 100 based on the converted text.

Also, when a user voice for displaying a visualized image is received through a microphone (not shown), the processor 270 may control the communicator 255 to transmit a signal requesting transmission of a visualized image to the electronic apparatus 100.

Specifically, when a user voice for displaying a visualized image is received through a microphone (not shown), the processor 270 may convert an analogue signal corresponding to the user voice into a digital signal, and transmit the digital signal converted through wireless communication such as Bluetooth and Wifi to the electronic apparatus 100.

In this case, the electronic apparatus 100 may control the camera 120 to photograph the area where the display apparatus 200 is installed, based on the signal received from the display apparatus 200. Then, when the area where the display apparatus 200 is installed is photographed through the camera 120, the electronic apparatus 100 may identify the display apparatus 200 and the surrounding area of the display apparatus 200 in the photographed image as described above, and generate a visualized image based on the surrounding area. Afterwards, when the visualized image is received from the electronic apparatus 100, the processor 270 may control the panel part 280 to display the visualized image.

Alternatively, when a user voice for displaying a visualized image is received through a microphone (not shown), the processor 270 may transmit a signal requesting transmission of a visualized image to an external server (not shown) through wireless communication such as Wifi.

In this case, the external server (not shown) may convert the user voice into a text through a speech to text (STT) algorithm, analyze the converted text, transmit a signal requesting transmission of a visualized image to the electronic apparatus 100, and afterwards, receive a visualized image from the electronic apparatus 100. Then, when a visualized image is received from the external server (not shown), the processor 270 may control the panel part 280 to display the visualized image.

Meanwhile, in the above, it was described that a visualized image is generated by the electronic apparatus 100, but generation of a visualized image may be performed by the display apparatus 200.

According to an embodiment of the disclosure, if an image that photographed the area including the display apparatus 200 is received from the electronic apparatus 100, the processor 270 may identify the display apparatus 200 and the surrounding area of the display apparatus 200 in the photographed image, and obtain a pattern corresponding to the photographed image based on the surrounding area. Then, the processor 270 may cluster colors included in the surrounding area based on similarity among each color, and generate a visualized image by applying the clustered colors to the obtained pattern. Further, the processor 270 may control the panel part 280 to display the generated visualized image.

Figure 27:
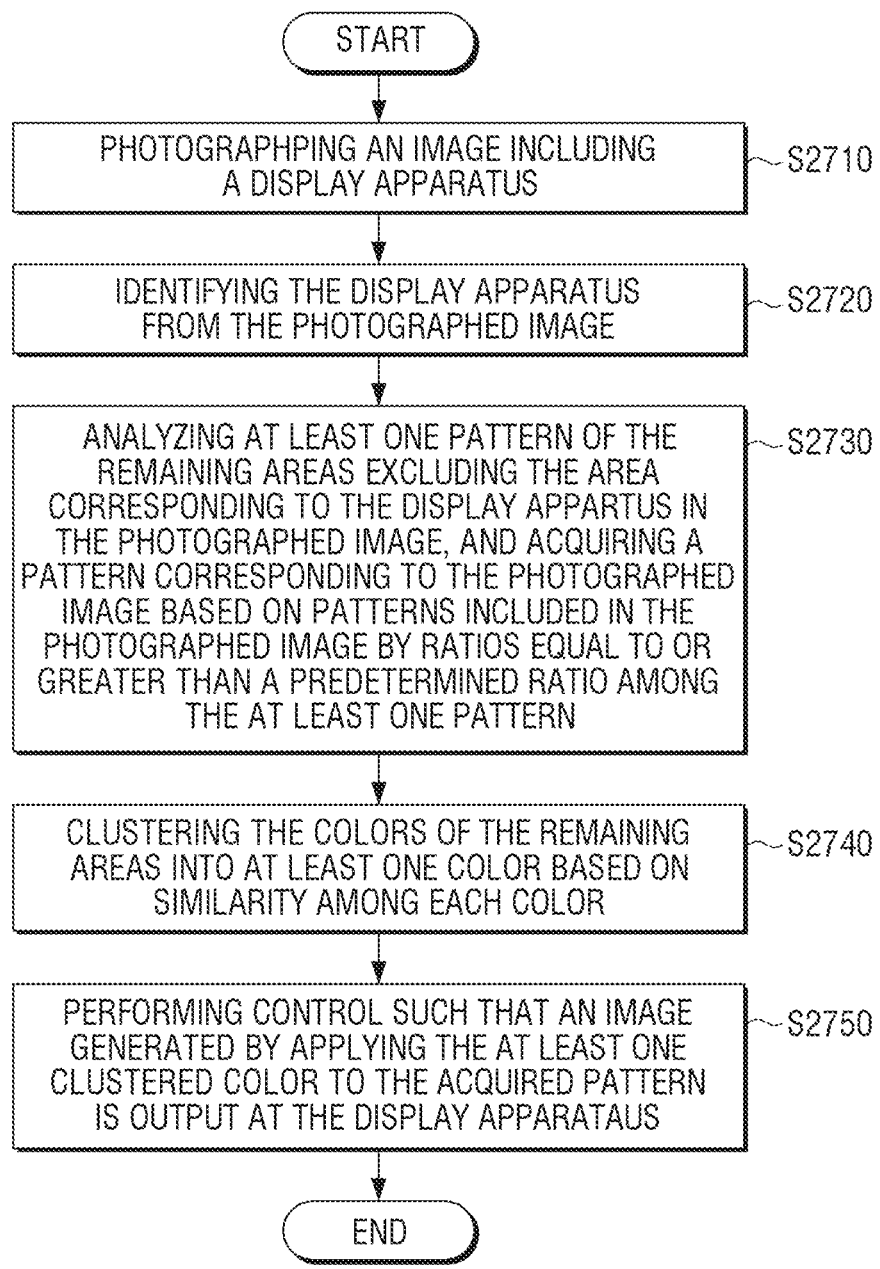
FIG. 27 is a flow chart for illustrating a control method of an electronic apparatus according to an embodiment of the disclosure.

FIG. 27 is a flow chart for illustrating a control method of an electronic apparatus according to an embodiment of the disclosure.

The electronic apparatus 100 may photograph an image including the display apparatus 200 at operation S2710. Specifically, the electronic apparatus 100 may photograph an image including the display apparatus 200 and the surrounding area of the display apparatus 200 through a camera.

Then, the electronic apparatus 100 may identify the display apparatus 200 from the photographed image at operation S2720. As an example, the electronic apparatus 100 may identify the display apparatus 200 through an objection recognition algorithm.

Further, the electronic apparatus 100 may analyze at least one pattern of the remaining areas excluding the area corresponding to the display apparatus 200 in the photographed image, and obtain a pattern corresponding to the photographed image based on patterns included in the photographed image by ratios equal to or greater than a predetermined ratio among the at least one pattern at operation S2730.

Here, a pattern corresponding to the photographed image may not only be one of a plurality of pre-stored patterns in the electronic apparatus 100, but also a pattern obtained from an external server (not shown).

Also, the electronic apparatus 100 may cluster the colors of the remaining areas into at least one color based on similarity among each color at operation S2740. Specifically, the electronic apparatus 100 may cluster the colors of the surrounding area of the display apparatus 200 based on similarity among each color, through a K-means algorithm.

Afterwards, the electronic apparatus 100 may perform control such that an image generated by applying the at least one clustered color to the obtained pattern is output at the display apparatus at operation S2750.

Accordingly, the display apparatus 200 may output an image that is matched up with the surrounding area of the display apparatus 200. In this case, the display apparatus 200 may function as an interior element, and a user may have an experience where it feels like there is no display apparatus 200.

Meanwhile, methods according to the aforementioned various embodiments of the disclosure may be implemented in the forms of software or applications that can be installed on conventional electronic apparatuses.

Also, methods according to the aforementioned various embodiments of the disclosure may be implemented only with software upgrade, or hardware upgrade of conventional electronic apparatuses.

In addition, the aforementioned various embodiments of the disclosure may be performed through an embedded server provided on an electronic apparatus, or an external server of an electronic apparatus.

Meanwhile, a non-transitory computer readable medium storing a program sequentially performing a control method of an electronic apparatus according to the disclosure may be provided.

Meanwhile, a non-transitory computer readable medium refers to a medium that stores data semi-permanently, and is readable by machines, but not a medium that stores data for a short moment such as a register, a cache, and a memory. Specifically, the aforementioned various applications or programs may be provided while being stored in a non-transitory computer readable medium such as a CD, a DVD, a hard disc, a blue-ray disc, a USB, a memory card, a ROM and the like.

While embodiments of the disclosure have been shown and described so far, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
   a communicator;
   a camera; and
   a processor configured to:
   control the camera to obtain an image including a display apparatus,
   identify the display apparatus in the image,
   identify a display area corresponding to the identified display apparatus in the image and a surrounding area excluding the display area in the image,
   identify a plurality of shapes of a plurality of objects included in the surrounding area,
   identify a pattern corresponding to the image based on a shape that occupies the surrounding area at a predetermined ratio or more among the plurality of shapes,
   cluster colors of the surrounding area into a plurality of clustered colors, and
   control the communicator to communicate with the display apparatus such that an image by applying the plurality of clustered colors to the identified pattern is output by the display apparatus.

2. The electronic apparatus of claim 1, wherein the processor is further configured to analyze the at least one pattern of the surrounding area in different directions relative to the display apparatus, and identify the pattern corresponding to the image based on locations of respective objects in the at least one pattern and the predetermined ratio.

3. The electronic apparatus of claim 2, wherein the processor is further configured to:
   analyze a color of each object in the at least one pattern, cluster the colors of the surrounding area based on a similarity among the respective colors of the objects, and apply the plurality of clustered colors to the identified pattern based on a location of the clustered colors.

4. The electronic apparatus of claim 2, wherein the processor is further configured to analyze colors of the at least one pattern in units of pixels, and cluster pixels where a similarity among the analyzed colors is greater than or equal to a predetermined threshold.

5. The electronic apparatus of claim 1, wherein the processor is further configured to identify the pattern corresponding to the image from a plurality of pre-stored patterns.

6. The electronic apparatus of claim 5, wherein the processor is further configured to apply additionally clustered colors to the identified pattern.

7. The electronic apparatus of claim 1, wherein the processor is further configured to apply colors in the plurality of clustered colors occupying the surrounding area in a ratio greater than or equal to a predetermined ratio to the identified pattern.

8. The electronic apparatus of claim 1, wherein the processor is further configured to apply colors in the plurality of clustered colors randomly to the identified pattern.

9. The electronic apparatus of claim 1, wherein the processor is further configured to identify a ratio that each color of the plurality of clustered colors occupies in the surrounding area, and apply the colors of the plurality of clustered colors of which the identified ratios are high to the identified pattern more than the colors of the plurality of clustered colors of which the identified ratios are low.

10. The electronic apparatus of claim 1, wherein the processor is further configured to identify a ratio that each color of the plurality of clustered colors occupies in the surrounding area, balance the ratio of each color of the plurality of clustered colors, and apply the balanced plurality of clustered colors to the identified pattern.

11. A control method to be performed by an electronic apparatus, the control method comprising:
obtaining an image including a display apparatus;
identifying the display apparatus in the image;
identifying a display area corresponding to the identified display apparatus in the image and a surrounding area excluding the display area in the image;
identifying a plurality of shapes of a plurality of objects included in the surrounding area;
identifying a pattern corresponding to the image based on a shape that occupies the surrounding area at a predetermined ratio or more among the plurality of shapes;
clustering colors of the surrounding area into a plurality of clustered colors; and
controlling communication with the display apparatus such that an image applying the plurality of clustered colors to the identified pattern is output by the display apparatus.

12. The control method of claim 11, further comprising:
analyzing at least one pattern of the surrounding area in different directions relative to the display apparatus,
wherein the identifying the pattern corresponding to the image further comprises identifying the pattern corresponding to the image based on locations of respective objects in the at least one pattern and the predetermined ratio.

13. The control method of claim 12, further comprising:
analyzing a color of each object in the at least one pattern;
cluster the colors of the surrounding area based on a similarity among the respective colors of the objects; and
applying the plurality of clustered colors to the identified pattern based on a location of the clustered colors.

14. The control method of claim 12, wherein the clustering further comprises analyzing colors of the at least one pattern in units of pixels, and clustering pixels where a similarity among the analyzed colors is greater than or equal to a predetermined threshold.

15. The control method of claim 11, wherein the identifying the pattern corresponding to the image further comprises identifying the pattern corresponding to the image from a plurality of pre-stored patterns.

16. The control method of claim 15, further comprising:
applying additionally clustered colors to the identified pattern.

17. The control method of claim 11, further comprising:
applying colors in the plurality of clustered colors occupying the surrounding area in a ratio greater than or equal to a predetermined ratio to the identified pattern.

18. The control method of claim 11, further comprising:
applying colors in the plurality of clustered colors randomly to the identified pattern.

19. The control method of claim 11, further comprising:
identifying a ratio that each color of the plurality of clustered colors occupies in the surrounding area; and
applying the colors of the plurality of clustered colors of which the identified ratios are high to the identified pattern more than the colors of the plurality of clustered colors of which the identified ratios are low.

20. The control method of claim 11, further comprising:
identifying a ratio that each color of the plurality of clustered colors occupies in the surrounding area; balancing the ratio of each color of the plurality of clustered colors; and applying the balanced plurality of clustered colors to the identified pattern.

* * * * *

UNITED STATES PATENT AND TRADEMARK OFFICE
CERTIFICATE OF CORRECTION

PATENT NO.         : 11,113,850 B2                                    Page 1 of 1
APPLICATION NO.    : 16/526174
DATED              : September 7, 2021
INVENTOR(S)        : Byounghyun Kim et al.

It is certified that error appears in the above-identified patent and that said Letters Patent is hereby corrected as shown below:

In the Claims

Column 22, Line 55:
In Claim 1, delete "image by" and insert -- image --, therefor.

Column 22, Line 59:
In Claim 2, delete "analyze the" and insert -- analyze --, therefor.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*